United States Patent
Cherry et al.

(10) Patent No.: US 10,920,793 B2
(45) Date of Patent: Feb. 16, 2021

(54) ENERGY RECOVERY-RECYCLING TURBINE INTEGRATED WITH A CAPILLARY TUBE GAS COMPRESSOR

(71) Applicant: Carnot Compression LLC, Reno, NV (US)

(72) Inventors: Mark A. Cherry, Sagle, ID (US); Robert A. Alderman, Sagle, ID (US); Danil Hans Shillinger, Nevada City, CA (US)

(73) Assignee: CARNOT COMPRESSION INC., Reno, NV (US)

(*) Notice: Subject to any disclaimer, the term of this patent is extended or adjusted under 35 U.S.C. 154(b) by 127 days.

(21) Appl. No.: 16/418,535

(22) Filed: May 21, 2019

(65) Prior Publication Data
US 2019/0331138 A1  Oct. 31, 2019

Related U.S. Application Data

(63) Continuation of application No. 15/429,710, filed on Feb. 10, 2017, now Pat. No. 10,359,055.

(51) Int. Cl.
*F04D 17/18* (2006.01)
*F04F 5/06* (2006.01)
(Continued)

(52) U.S. Cl.
CPC ............... *F04F 5/06* (2013.01); *F04D 17/10* (2013.01); *F04D 17/18* (2013.01); *F04D 25/045* (2013.01);
(Continued)

(58) Field of Classification Search
CPC ...... F04D 17/10; F04D 17/18; F04D 29/2222; F04D 29/284; F04D 31/00; F03B 3/08
See application file for complete search history.

(56) References Cited

U.S. PATENT DOCUMENTS

| 892,772 A | 7/1908 | Taylor |
| 1,101,929 A | 6/1914 | Hayes |

(Continued)

FOREIGN PATENT DOCUMENTS

| CN | 1174594 A | 2/1998 |
| CN | 102444579 A | 5/2012 |

(Continued)

OTHER PUBLICATIONS

US. Appl. No. 14/280,780, filed May 19, 2014, Cherry et al.
(Continued)

*Primary Examiner* — Ninh H. Nguyen
(74) *Attorney, Agent, or Firm* — BakerHostetler

(57) ABSTRACT

A centrifugal gas compressor with rotating hollow housing and an independently rotating, turbine compresses gas bubbles in capillary tubes and recovers energy from the liquid drain (sometimes a liquid recycler). The housing rotatably retains an internal spool having the turbine. Gas-liquid emulsion fed to the capillaries generates compressed gas-liquid emulsion at a radially distal annular region in an annular lake within the spool. Compressed gas leaves the lake and is ported away. A turbine blade edge in spilt over liquid drives the turbine, converting angular velocity/momentum into shaft torque as recovered energy. Blade captured liquid is recycled to capillary inputs.

10 Claims, 12 Drawing Sheets

(51) Int. Cl.

| | | |
|---|---|---|
| *F04D 31/00* | (2006.01) | |
| *F04D 17/10* | (2006.01) | |
| *F04D 25/04* | (2006.01) | |
| *H02K 7/18* | (2006.01) | |
| *F04D 29/22* | (2006.01) | |
| *F04F 5/42* | (2006.01) | |
| *F01D 5/04* | (2006.01) | |

(52) U.S. Cl.
CPC ......... *F04D 29/2222* (2013.01); *F04D 31/00* (2013.01); *F04F 5/42* (2013.01); *H02K 7/1823* (2013.01); *F01D 5/048* (2013.01); *F05D 2210/132* (2013.01); *F05D 2220/62* (2013.01); *F05D 2260/601* (2013.01)

(56) References Cited

U.S. PATENT DOCUMENTS

| | | | |
|---|---|---|---|
| 1,144,865 A | | 6/1915 | Rees |
| 1,457,536 A | * | 6/1923 | MacLean ................ F04D 17/18 417/67 |
| 1,769,260 A | | 7/1930 | Hughes |
| 1,864,640 A | * | 6/1932 | Dalrymple .............. F04C 19/00 417/68 |
| 1,994,450 A | * | 3/1935 | Carpenter ............... F04D 17/18 417/67 |
| 2,025,037 A | | 12/1935 | Bergamann |
| 2,076,586 A | | 4/1937 | Noble |
| 2,118,371 A | | 5/1938 | Bergmann |
| 2,230,183 A | | 1/1941 | Ford |
| 2,260,600 A | | 10/1941 | Boeckeler |
| 3,221,659 A | | 12/1965 | Adams |
| 3,517,229 A | | 6/1970 | Bidard |
| 3,559,419 A | | 2/1971 | Kantor |
| 3,584,878 A | | 6/1971 | Saburo |
| 3,584,978 A | | 6/1971 | Shimoi |
| 3,650,636 A | * | 3/1972 | Eskeli ..................... F04D 17/18 417/78 |
| 3,761,195 A | | 9/1973 | Eskeli |
| 4,027,993 A | | 6/1977 | Wolff |
| 4,362,473 A | | 12/1982 | Zeilon |
| 4,439,200 A | | 3/1984 | Meyer et al. |
| 4,626,176 A | | 12/1986 | Cole |
| 5,011,371 A | | 4/1991 | Goltemoller |
| 5,154,583 A | | 10/1992 | Althaus et al. |
| 5,733,253 A | | 3/1998 | Headley |
| 6,042,346 A | | 3/2000 | Doi |
| 6,276,140 B1 | | 8/2001 | Keller et al. |
| 6,565,315 B1 | | 5/2003 | Bertels et al. |
| 6,713,028 B1 | | 3/2004 | Oklejas, Jr. |
| 6,723,205 B1 | | 4/2004 | Meinander |
| 7,905,360 B2 | | 3/2011 | Della Casa |
| 9,618,013 B2 | | 4/2017 | Cherry et al. |
| 9,919,243 B2 | | 3/2018 | Cherry et al. |
| 2003/0106302 A1 | | 6/2003 | Ray |
| 2004/0101414 A1 | | 5/2004 | Gharib et al. |
| 2004/0197195 A1 | | 10/2004 | Ogolla et al. |
| 2005/0047270 A1 | | 3/2005 | Wood et al. |
| 2005/0175449 A1 | | 8/2005 | Yonehara |
| 2006/0059904 A1 | | 3/2006 | Shevket |
| 2010/0329891 A1 | | 12/2010 | Fong et al. |
| 2011/0030359 A1 | | 2/2011 | Fong et al. |
| 2011/0115223 A1 | | 5/2011 | Stahlkopf et al. |
| 2015/0023807 A1 | | 1/2015 | Cherry et al. |
| 2015/0322763 A1 | | 11/2015 | Bjorge et al. |
| 2016/0102673 A1 | | 4/2016 | Cherry et al. |
| 2018/0231029 A1 | | 8/2018 | Cherry et al. |

FOREIGN PATENT DOCUMENTS

| | | |
|---|---|---|
| CN | 103733003 A | 4/2014 |
| CN | 102655925 B | 1/2015 |
| CN | 105555413 A | 5/2016 |
| DE | 1106028 B | 5/1961 |
| DE | 2356013 A1 | 5/1975 |
| EP | 0096713 A1 | 12/1983 |
| FR | 2248731 A6 | 5/1975 |
| FR | 2589957 A1 | 5/1987 |
| JP | 2016-531734 A | 10/2016 |
| WO | WO 1983/002134 A1 | 6/1983 |
| WO | WO 1987/003051 A1 | 5/1987 |

OTHER PUBLICATIONS

U.S. Appl. No. 62/222,261, filed Sep. 23, 2015, Cherry et al.
Turbines by J.B. Calvert, Feb. 11, 2010 "Turbines" https://mysite.du.edu/jcalvert/tech/fluids/turbine.htm (14 pages).
"Variable Speed Fluid Couplings Driving Centrifugal Compressors and Other Centrifugal Machinery" by Gunther H. Peikert, Houston, Texas (7 pages).
"A Fundamentally New Approach to Air-Cooled Heat Exchangers" by Jeffrey P. Koplow, Jan. 2010, Sandia National Laboratories (48 pages).
Patent Cooperation Treaty International Search Report, PCT/US15/55427, dated Sep. 1, 2016.
European Supplementary Examination Report, PCT/US2014045853, dated Jun. 23, 2016.
Notification of Transmittal of the International Search Report PCT/US/2015/055427, dated Feb. 2, 2016.
PCT Notification of Transmittal of International Preliminary Report on Patentability, PCT/US14/45853, dated Apr. 10, 2015.
Phasor Analysis of Linear Mechanical Systems and Linear Differential Equations ME 104, PRof. B. Paden.
EA3: Systems Dynamics, V1.7 Weakly-Coupled Oscillators, Sridhar Krishnaswamy.
A Guide to Mechanical Impedance and Strutctural Response Techniques, Bruel & Kjaer.
International Patent Application No. PCT/US2018/014399; Int'l Written Opinion and the Search Report; dated Mar. 26, 2018; 14 pages.
International Patent Application No. PCT/US2018/014399; Int'l Preliminary Report on Patentability; dated Apr. 3, 2019; 31 pages.
European Patent Application No. 18751919.4; Extended Search Report; dated Oct. 22, 2020; 5 pages.
International Patent Application No. PCT/US2020/033877; Int'l Search Report and the Written Opinion; dated Aug. 17, 2020; 13 pages.

\* cited by examiner

Heat Dissipating External Housing

ENERGY RECOVERY-RECYCLING TURBINE INTEGRATED WITH A CAPILLARY TUBE GAS COMPRESSOR

CROSS REFERENCE TO RELATED APPLICATIONS

This application is a continuation of U.S. patent application Ser. No. 15/429,710, filed Feb. 20, 2017, the contents of which is incorporated herein by reference in its entirety.

The present invention relates to a method and a system for integrating an energy recovery turbine sub-system into a gas compressor that employs micro-channel capillary tubes to compress gas entrained in the capillary tubes with the use of centrifugal force created and contained by a rotating main housing body of the compressor wherein the energy recovery turbine rotates independently with respect to the rotating main housing body. The present invention also relates to a liquid recycling gas compressor which does not include the energy recovery.

BACKGROUND OF THE INVENTION

Gas compressors are used for many items in the consumer market (to inflate basketballs, toys and tires) and in the industrial market (to liquefy gas, compress gas for transport fuel, for powering pneumatic tools and for distributing natural gas from the well head to the user).

The efficiency of prior art commercial gas compressors is poor primarily because practicalities require that the gas be compressed rapidly. Rapid compression makes it nearly impossible to dissipate the heat of compression during the compression process. This inherent heating during the compression process (herein "C-heat") demands up to 100% more physical work from the prime mover than if the same process was done with complete and immediate "C-heat" removal. Typically, the prime mover is an internal combustion engine or an electric motor. A rapid compression process with little or no C-heat heat removal is called an adiabatic compression. Most state of the art compressors operate with adiabatic or semi-adiabatic compression cycles. The energy or work lost due to C-heat increases as the final target pressure for the compressor increases. This why multiple stages of compression, with intercoolers in-between, are used to reach high final pressures.

The work potential of the compressed gas is roughly equivalent to the work required to compress the gas, if the compressed gas is used rapidly while it is still hot. However, most compressed gas is stored in an uninsulated pressure vessel and the time between the compression of the gas and the use of the gas makes retention of the heat in the gas impractical. Therefore, this 50-100% additional work to overcome the C-heat while compressing the gas is lost or wasted. Compression performed while immediately removing all of the C-heat is called isothermal compression. If isothermal compression can be achieved, the energy required to compress gas to a given pressure could theoretically be cut nearly in half. Stated otherwise, twice the amount of compressed, gas could be produced for the same cost in energy or dollars. Historically isothermal compression has been impractical or impossible to achieve because the C-heat removal from the: compressed gas requires too much time and/or internal heat transfer surface area for practical use, One type of prior art compressor that demonstrates rapid isothermal compression is U.S. Pat. No. 892,772 to Taylor, patented in 1908. Taylor '772 discloses a hydraulic air compressor which utilizes a falling column of water infused with millions of tiny spherical bubbles. When the column of water falls from a particular height, the bubbles in the water are compressed. The Taylor '772 system used a 70 foot differential head pressure (about 21 meters) which creates approximately 128 psi (pounds per square inch) pressure to drive 5000-6000 horsepower isothermal compressors.

In order to make hydraulic bubble, isothermal compressors portable and practical, U.S. Patent Application Publication No. 20150023807 to Cherry et at, ("Cherry '807") Ser. No. 14/280,780, filed May 19, 2014 (the contents of which is incorporated herein by reference thereto) discloses the use of centrifugal force to shrink the physical size of a column of water necessary to reach industrial pressures by at least 1000 times. Centrifugal force acts on gas bubbles entrained between liquid slugs moving radially outward (distally away from the axis of rotation) through the capillary compression tubes which may be radial, tangential or continuously curved. Compressed gas is collected in the annular pressurized gas separation and storage chamber, whereupon it is harvested for industrial use. A gas-liquid emulsion is fed to the capillary compression tubes by an inboard emulsification device. The emulsification device may include a vortex generator, an ejector or a venturi injector, all feeding the gas-liquid mixture into the inboard ends of the capillaries. The capillaries are formed in a series of discs, coaxially stacked with outer disc ends open to the annular space.

U.S. Patent Application Ser. No. 62/222,261, filed Sep. 23, 2015 to Cherry et al ("Cherry '261") (the contents of which is incorporated herein by reference thereto) discloses improvements to the device and methods disclosed in Cherry et al '807 using directional flow restriction technology to ensure that emulsion flow through the capillary compression tubes of a centrifugal bubble compressor move only in a radially outward direction.

U.S. Pat. No. 6,276,140 to Keller discloses a device to generate energy through a turbine engine. The Keller '140 device also uses, falling water fed through a funnel shaped vertical tube or tunnel in order to compress air bubbles in the falling water. The waterfall drop in Keller '140 was between 30-100 meters. Typical diameters at the top of the Keller '140 funnel tube are approximately 2-7 meters and, at the bottom, the funnel outlet region is typically 0.7-2.0 meters.

U.S. Pat. No. 1,144,865 to Rees discloses a rotary pump, condenser and compressor. However, the Rees '865 rotary pump compressor utilized large cavities having highly curved shaped walls and the cavities were not radial with respect to the rotating container.

U.S. Patent Application Publication No. 2011/0030359 to Fong entitled Compressed Air Energy Storage System Utilizing Two-Phase Flow to Facilitate Heat Exchange (Ser. No. 12/686,695, filed Aug. 25, 2010) generally discusses a centrifugal separator in paragraphs 0963, 0964, 0959 and 0983. However, Fong '359 does not provide of a centrifugal separator.

U.S. Patent Application Publication No. 2011/0115223 to Stahlkopf entitled Compressed Air Energy Storage System Utilizing Two-Phase Flow to Facilitate Heat Exchange (Ser. No. 13/010,683, filed Jan. 20, 2011) also discusses centrifugal separators.

Neither Fong '359 or Stahlkopf '223 discuss a centrifugal compressor which compresses bubbles in water or a liquid in an isothermal manner to extract the compressed air or gas.

U.S. Pat. No. 1,769,260 to Hughes discloses a centrifugal pump and condenser that uses capillary tubes to compress gas bubbles in a similar manner to this device, however it differs in several important ways. The manner in which Hughes '260 creates a bubble train (see gas receiving chamber 21) results in much longer and larger bubbles, which larger bubbles have correspondingly greater buoyancy and this greater buoyancy make it very difficult to force these larger bubbles towards the distal end of the compression tube than the fine emulsion in the Cherry '807 and '261 disclosures. The shroud 24 in Hughes '260 is a trough that collects water as the water leaves the capillary chambers 22 at their radially distal ends. The trough fills with water trapped due to centrifugal force at a depth determined by the inward facing flanges 25, "over" which excess water drains to the inside wall of stationary cylindrical casing 10. The radially outboard ends of the capillary chambers 22 extend radially beyond the internal diameter of the inward facing flanges 25, creating a gas seal.

In Hughes '260, the shroud 24 is similar to the rotating housing in Cherry '807, Ser. No. 14/280,780, filed May 19, 2014, in the sense that the ends of the compression tubes are radially (and hydraulically) below the level of the drain on the cover plate, creating a gas seal. The Cherry '807 design is different by virtue of the fact that the rotating housing is not just a gas seal but also acts as a pressurized gas storage housing and a gas/liquid separation chamber as well, whereas Hughes' shroud has no significant pressure differential. The Hughes shroud 24 does act as a seal but does not act as a rectifying agent to enforce unidirectional distal flow as this device does.

The present invention expands upon the method and system in Cherry '807 which relies on centrifugal force to enhance the weight of intermediate liquid slugs acting on entrained gas bubbles moving through the micro-channel capillary tubes which enhanced weight in a rotary environment overcomes bubble buoyancy and causes the bubbles to transit through the capillary tubes to an outer radial position (stated otherwise, the bubbles "sink" to the outside of rotation), absorbing the heat of compression and thereby isothermally compressing the gas.

The present invention also builds upon the Cherry '261 method and system by creating, enforcing and enhancing distally oriented unidirectional emulsion flow in the capillary compression tubes with the use of mechanical checking or prohibition of reverse flow, the dynamic enforcement of distal (that is generally radially outward) emulsion flow, checking or prohibiting bubble buoyancy which is contrary to the radially outboard movement of the bubbles towards the distal ends of the tubes, which buoyancy is counter the emulsion exit velocity, and tapering the tube diameters longitudinally to match the rate of bubble diameter reduction during compression.

The general focus of Cherry '807 and '261 is the isothermal compression of gas in a rotating bubble compressor. In earlier constructs of the Cherry '807 and '261 devices, some energy imparted to the water in the impeller/compression tube device is recovered in the design of the drain race. This energy recovery occurs, by converting the high angular momentum of the water entering the drain race into shaft torque. This torque conversion occurs by forcing the water to slow down due to the presence of radial vanes in the drain race. The principle of torque conversion is the same principle that many hydroelectric turbines rely on to convert angular momentum in water to shaft torque in order to generate electricity at a hydroelectric facility.

As explained in a prior art reference entitled "Turbines", by J. B. Calvert, February 2010, torque is the rate of change of angular momentum, just as force is the rate of change of linear momentum. When a fluid exerts a torque on a turbine runner, the reaction is a change in angular momentum of the fluid. Fluid is given angular momentum by the guide vanes which, ideally, is converted to by the torque exerted on the runner. With some machines, however, the water at the exit, may still have considerable angular momentum, and the energy in this motion is energy that does not appear at the shaft.

OBJECTS OF THE INVENTION

It is an object of the present invention to provide a method of conserving and using the remaining energy inherent in the compression liquid in a bubble compressor by creating two different column lengths in a liquid system in a rotating field subject to different centrifugal forces, thereby creating a short liquid column length under a higher centrifugal force that has the same distal end pressure as a longer liquid column length under a lesser centrifugal force field. The higher and lower centrifugal forces are caused by the differing angular velocities of the two different column lengths of liquid. The shorter column length of liquid operates at a higher RPM and the longer column length of liquid operates at a slower RPM, yet the distal ends of these two column lengths of liquid are at the same pressure.

It is another object of the present invention to conserve and use the remaining energy inherent in the compression liquid of a centrifugal bubble compressor after the compression cycle through the use of a reverse turbine.

It is an additional object of the present invention to recycle the compressed liquid in a centrifugal bubble compressor for reuse after the compression stage of the cycle through the employment of a supplemental coaxial turbine. It is a further object of the present invention to create and introduce a gas-liquid emulsion (or liquid-gas emulsion) for the purpose of compressing the gas in a centrifugal bubble compressor using a siphon carrying a liquid to pull gas into the liquid, thereby creating an emulsion that is fed into micro-channel capillary tubes.

Another object of the present invention removes the heat of compression produced during operation through the use of heat transference to, and through, the external rotating housing where it is dissipated through a dual function heat fin and/or fan blade arrangement.

BRIEF DESCRIPTION OF THE DRAWINGS

Further objects and advantages of the present invention are discussed in connection the detailed descriptions of the preferred embodiments when taken in conjunction with the accompanying drawings.

SUMMARY OF THE INVENTION

Figure 1:
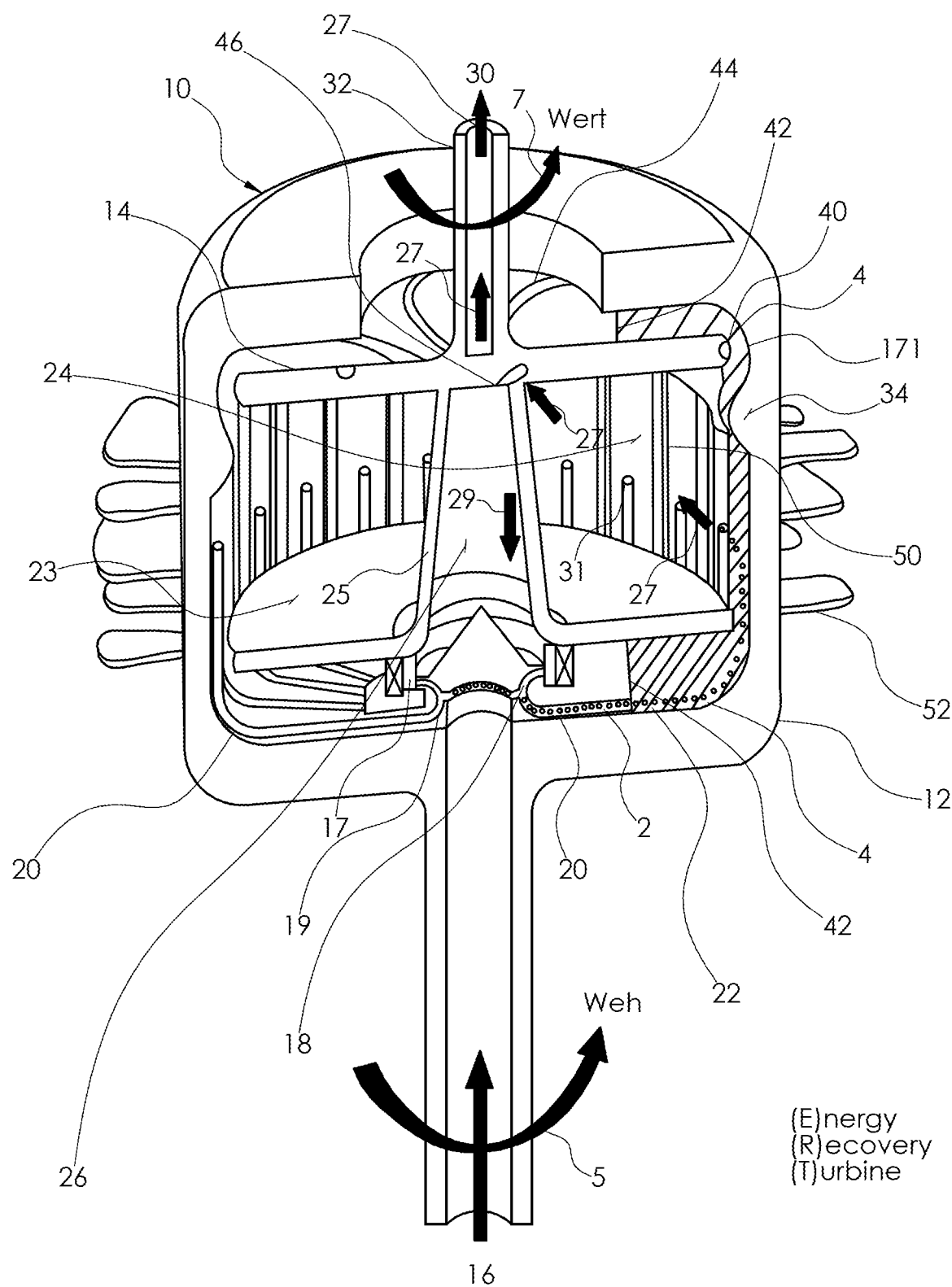
FIG. 1 diagrammatically illustrates the rotating external gas compressor housing having capillary tubes generally running from radially inboard positions to radially outboard positions, the output ports of the capillary tubes terminating in a pressurized gas chamber, wherein the gas chamber is axially delineated by a spool formed of a pressure plate at one axial position and a turbine blade or disk element at another axial position, and the pressure plate and turbine plate rotates independently of the rotating external housing and the capillary tubes.

As described above, Cherry '807 and '261 explain an isothermal compression of gas in a rotating bubble compressor which recovers some but not all of the energy imparted to the water in the impeller/compression tube device by way of the design of the drain race. The present Energy Recovery Turbine (ERT) invention is designed to recover a substantial portion (nearly 25% kinetic energy) left in the water exiting the drain race internal diameter or ID. Broadly, the present invention uses a coaxial, independent secondary turbine (independent of the rotating compressor body) in the liquid drain pathway and a pitot drain pathway.

The ERT method and system improves the Cherry '807 and '261 systems by employing methods to (1) internally recycle and reuse the compression liquid after the compression and separation stage of the cycle during operation; (2) improve the efficiency of the device by conserving and using the energy inherent in the compression fluid alter the separation stage of the cycle; (3) identifying a low head emulsion creation method through use of a rotating siphon, and (4) dissipating the heat of compression through the external rotating housing and heat fins arranged on its external surface to act as hybrid fan blades/radiator surfaces.

The present invention relates to a method of compressing gas bubbles in a rotating substantially hollow cylindrical housing while recovering energy from the liquid entraining the gas bubbles and a system for the same. Also, the invention relates to a gas compressor with a liquid recycler. The method includes the use of a external substantially hollow cylindrical housing rotating at a first speed and an internal spool rotating a second speed slower than the first speed. The spool is substantially inside the hollow cylindrical housing, which housing rotates independently of the internal spool. A gas-liquid emulsion is formed in a radially proximal chamber in the hollow cylindrical housing. Gas bubbles are compressed in the gas-liquid emulsion by the application of capillary action and centrifugal force as the gas bubbles are forced through a plurality of radially extending capillary tubes, which extend radially away from a chamber near the axis of rotation to a radially distal annular region within the housing. As a result, a compressed gas-liquid emulsion is formed in the distal annular region.

An annular lake of compressed gas-liquid emulsion forms in the housing and the internal spool thereby permitting compressed gas bubbles to escape the annular lake. The escaped compressed gas bubbles effect the radial depth of the annular lake. The escaping compressed gas bubbles from the lake is ported off at a radially distal annular region. The spool has a turbine blade. The turbine blade is driven by immersing the blade into the emulsion in the annular lake. One or both of the angular velocity and the angular momentum from the emulsion in the annular lake is converted into turbine shaft torque as recovered energy.

The conversion of angular velocity or angular momentum is effected by forcing the spilt over liquid to pass over continuously curved arc shapes from the turbine blade edge (a radially distal leading edge) to a radially inboard trailing edge of the turbine blade shape. The conversion is effected by forcing the emulsion from the lake over these continuously curved arc shapes in the turbine blade. In one embodiment, the housing is rotated by a motor supplied with electrical energy partly or wholly created by the turbine shaft torque. Otherwise, the shaft torque is mechanically applied to assist the prime mover driving the housing.

Other features include damming a portion of the annular lake such that a portion of the emulsion from the lake axially spills over the dam thereby forming spilt over liquid. Once the annular lake emulsion reaches the axial position of the dam, most if not all of the gas in the emulsion is a solute, therefore reference is made to spilt over liquid. The spilt over liquid drives the turbine blade due to the blade's immersion into the spilt over liquid. The spilt over liquid is fed into turbine blades or turbine-defined pathways or passages and these blades or passages run and form a continuously curved arc shape from a leading turbine blade edge at the passage input to a radially inboard trailing edge at the passage outlet. The liquid output from these blade passages is recycled back to the siphon emulsifiers. Rather than siphons, the emulsifiers may be capillary tubes terminating in castellated tube ends which suck up gas and liquid at a radially proximal region. Further, compressed gas is ported away from the annular lake and the annular compressed gas chamber at a radially proximal portal.

Another feature includes recycling the liquid after forcing the spilt over liquid through the turbine active surfaces, that is the continuously curved arc shaped turbine passages. The trailing edge of these passages are radially inboard of the leading edge of the passages. This recycling includes depositing the output of the curved arc turbine passages (the spilt over liquid fed into the passages) as recycled liquid into a number of siphons. The recycled liquid siphons off gas (from a gas source) and delivers the resulting gas-liquid emulsion to the plurality of capillary tubes. The degree of siphon action is controlled by damming the recycled liquid upstream of the siphons. Castellated tube ends may also be used to create an emulsified gas-liquid mixture.

The gas compressor system includes a hollow cylindrical housing is rotated by a prime mover. A plurality of capillary tubes are fixed within the housing. Each capillary tube has a radially inboard input port near or proximal to the axis of rotation and a radially distal output port near an inboard wall of the housing. The outputs terminate in an annular chamber formed within the housing. A plurality of emulsifiers are supplied with gas and liquid and are radially disposed inboard of the capillary tube input ports. The output of each respective emulsifier is fluidly coupled to a corresponding capillary tube input port to supply the gas-liquid emulsion thereto. These tubes form compressed gas emulsion by capillary action of the gas-liquid emulsion passing therethrough. An internal spool is rotatably mounted in the annular chamber such that the spool rotates independently with respect to the housing. The spool has an outboard axial extension extending from the housing. The spool has a turbine blade which rotates the spool in the annular chamber. Further, the annular chamber defines an annular compressed gas chamber and also the chamber contains an annular lake of compressed gas-liquid emulsion. This annular lake is formed by compressed gas-liquid emulsion output from the capillary tube output ports. The compressed gas chamber contains compressed gas emanating from the compressed gas-liquid emulsion of the annular lake.

The turbine blade has a number or a plurality of fluid capture vanes which vanes radially distally extend into the annular lake thereby converting one or both of an angular velocity and an angular momentum from the compressed gas-liquid emulsion in the annular lake into turbine shaft torque applied to the output axial extension.

Further features of the invention include an internal spool with a pressure plate at one axial spool end and the turbine blade at another axial spool end. The pressure plate and the turbine blade have substantially the same radial extent and form the annular compressed gas chamber therebetween. The pressure plate is axially located closer to the emulsifiers than the turbine blade. The annular lake forms a liquid seal between the pressure plate and the turbine blade. The annular lake has an axial length between the pressure plate and the turbine blade and a radial lake depth therebetween which depth is greater than a radial space between the distal edge of the turbine blade and the inboard wall of the rotating housing. A dam is located beneath the annular lake and protrudes radially inboard from the inboard wall of the housing. The radial height of the dam is less than the radial depth of the annular lake. A portion of the compressed gas-liquid emulsion in the annular lake spills over the dam as spilt over liquid. The turbine has a plurality of fluid capture vanes which radially distally extend into the spilt over liquid. The spilt over liquid drives the turbine blade by coaction with the turbine vanes or passages.

The turbine blade may define continuously curved arc shapes or passageways from a radially distal leading turbine blade edge, at the blade or passageway input, to radially inboard trailing passageway edges or blade outputs. These fluid pathways lead from capture vanes to a turbine fluid output. These fluid pathways have continuously curved arc shapes wherein the outputs are radially inboard of the inputs. The spool may have a hollow coaxial frustoconical base which base runs between the turbine blade and the pressure plate (the spool defined by the plate, the base and the turbine). The frustoconical base is hollow and defines a central conical liquid collection chamber. At an axially located near the pressure plate, the hollow coaxial frustoconical base defines a radially inboard liquid annular space. This annular space is at one axial end of the central conical liquid collection chamber opposite the axial location of the turbine blade. The emulsifiers are supplied with liquid from the radially inboard liquid annular space.

Another feature of the invention includes a weir in the radially inboard liquid annular space. The weir is a raised radially extending wall (extending away from the center of rotation). The weir controls the radial depth of the liquid in the liquid annular space by forming an annular pool of liquid which is fed to the emulsifiers. These emulsifiers are multiple siphon passageways extending between the annular pool to the respective input port for each corresponding capillary tube. There is a gas inlet supplying gas to each siphon passageway and the gas-liquid emulsion is generated by the siphon passageway, the gas inlet and the annular pool. Rather than a weir and siphon system castellated capillary tube ends may be used. The system may also include a heat transfer subsystem with internally extending heat transfer fins and one or more externally extending heat transfer tins.

The liquid recycler in the gas compressor is similar to the energy recovery method and system. However, the liquid recycler has a brake operatively coupled to the spool and the recycler omits the output axial from the turbine-spool. The brake may be internal or external. If the brake is external, the brake operates on the outboard axial extension forming the output axle of the system.

DETAILED DESCRIPTION OF THE PREFERRED EMBODIMENTS

The present invention relates to a method and a system for an Energy Recovery Turbine (ERT) deployed within a bubble compressor. Also, the, system may be configured to recycle liquid without the energy recover element. Similar numerals designate similar items throughout the drawings.
Water Columns in a Centrifugal Force Field The basic theory employed in the Cherry '807 and '261 devices is a plurality of micro-channel capillary tubes extending generally radially in a rotating housing. The radially inboard ports or inlets of the capillary tubes are fed with an emulsified gas-liquid and as this mixture travels radially outward the centrifugal force increases, compressing the gas bubbles while the bubbles (or more accurately, the substantially non-compressible liquid between the bubbles) is subjected to capillary action (the purpose of the capillary tubes is to negate bubble buoyancy, enabling the bubbles to move radially outward away from the center of rotation). The capillary tube output ports or outlets terminate in a generally annular space within the rotating housing. After the emulsification with the compressed gas bubbles leaves the capillary tubes (at which time the, natural buoyancy returns to the bubbles, forcing them radially inward and thus causing the bubbles to leave the liquid) and enters the interior annular space of the rotating, the gas is emitted or emanates from the compressed gas emulsification in the annular space.

In some prior art gas compressors, a liquid dam or barrier controls the radial depth of the liquid-gas emulsification in the annular space as the compressed gas escapes the emulsified mixture. Liquid spilling over the radially inward extending dam-barrier is ported off the compressor. The compressed gas is independently ported out of the annular space at a radially inboard location above the radial depth of the compressed gas emulsification trapped by centrifugal force along the radially distal region of the annular space.

The Cherry '807 and '261 devices subject the compressed gas emulsification in the annular space to centrifugal force rather than a 1 G gravitational field. The Cherry '807 and '261 devices provide distally located mechanical barriers to divide and establish a gas/liquid separation and a gas storage chamber to facilitate the removal of the compressed gas from the compression gas-liquid mixture in the radially distal region of the annular space. In the Cherry '807 and '261 devices, the liquid is motivated from the inlet side to the drain race side by shortening the drain race height (physical distance of column from max OD toward ID (OD being the outer diameter and ID being the inner diameter). The difference between the inlet ID and the drain race ID becomes the differential "head" that causes the liquid to flow from the inlet side to the drain side.

This Cherry '807 and '261 devices are configured such that both the drain race and inlet sides of the liquid discharge system operate at the same RPM (stated otherwise, the drain race and the inlet are both fixed within the rotating gas compression housing as is the capillary tubes) and therefore are subject to the same forces or water column pressure per radial distance away from the axial centerline of rotation.

Therefore to cause a pressure differential, one water column needs to be physically shorter than the other.

The problem that the present ERT invention solves is that the energy inherent in the drain liquid (which may be water) is better conserved if the liquid recirculates through the compression operation of the rotating compressor but the liquid never leaves the rotational field. Solving this problem also eliminates the need to have external plumbing. So, the question becomes. "how do you get a longer water column on the drain side, yet maintain the same pressure?"

Centrifugal force is dependent upon RPM, so if there is a need for a longer water or liquid column that exerts the same hydraulic pressure at its distal end as the synchronous drain race, then there is a need to operate the drain race liquid column as a slower RPM.

By using two independently operating axles sharing the same axis of rotation (a coaxial configuration), one rotating the compression tube impeller, and the other configured to define the drain race for the liquid (such, as an independently rotating turbine plate in the rotating gas compression housing), it is possible to forcibly cause the drain race in the turbine plate to operate at a slower RPM and thereby cause the liquid (e.g., water) column in the drain race to be of sufficiently longer radial dimension, at the same radially distal end pressure, that the exit of the drain race is at a radial position that is smaller (closer to center of rotation) than the inlet of the compressor impeller.

Given an ideal machine, the ratio of gas compression impeller RPM to the ERT turbine RPM may be 95% of the compression impeller RPM. For example, if the impeller was operating at 4000 RPM, the ERT would only need 5% reduction in RPM or 3800 RPM in order to achieve the goal of returning the spent water back to center for reuse in the compression process. However, given certain operating conditions, gas-liquid combinations, component compositions and component designs (for example, the ERT turbine may be a tubular structure or have turbine vanes), the ratio of gas compression impeller RPM to the ERT turbine RPM may be between 99% to 50% of the compression impeller RPM.

The relative velocity energy contained in the water at maximum OD (at the radially distal end of the liquid drain), when entering the slower turning Energy Recovery Turbine (ERT), is hydraulically harvested by the ERT and converted electrically by a mechanically coupled ERT generator. For example, a BLOC motor configured as a generator and provided motive power by the angular velocity or energy of the liquid (BLDG motors are known as Brushless DC electric motors, sometimes referred to as BL motors, which are also known as electronically commutated motors (ECMs or EC motors)). Alternatively, rather than use a generator coupled to the independently rotating turbine plate, a mechanical coupler system of gears or belts could mechanically connect the slower spinning turbine with the prime mover coupled to the gas compressor housing.

The energy recaptured by the ERT generator is subtracted from the energy supplied by the prime mover coupled to the bubble compressor impeller, thus lessening the required net energy supplied to the system to compress the gas and overcome hydraulic friction in the system.

The System

The energy recovery System is generally illustrated in FIG. 1. The compressor with an internal energy recovery turbine is generally identified as combinatory system 10. Combinatory system 10 includes two independently rotatable subsystems, an exterior gas compression housing 12 with a plurality of radially extending capillary compression tubes 20 and an independently rotating energy recovery turbine subsystem having a turbine blade or plate 14, a pressure plate 23 and frustoconical spool base 25. Although bearing set 2 is shown at one axial location of combinatory system 10, bearings 2 providing the independent rotation of the ERT spool system 14, 25 and 23, the combinatory system 10 includes other bearings (not shown) including a bearing axially opposite bearing set 2 at the other axial end between the turbine subsystem's gas exit axle 32 and the external compression housing 12. Gas exit axle 32 is an extension member that extends axially outboard away from housing 12. As show in FIG. 5A, the gas compression housing 12 is mechanically coupled by coupler 110 to a prime mover 112. Therefore the gas compression housing 12 also is mounted on bearings to a stationary stand which bearings are not shown in the Figures.

In the illustrated embodiment of FIG. 1, gas is supplied at gas intake 16 to an interior chamber or passageway in axle 16. Gas is pulled into gas inlet 18. Some type of gas delivery system is used to supply gas into inlet 18. A suction is provided by liquid in siphon tube 19 which tube is a substantially U-shaped tube or passageway. For details, see tube 19 in FIG. 7. Gas inlet 18 is preferably gaseously coupled (otherwise referred to as being fluidly coupled) to the bottom of the U-shaped siphon tube 19. As explained later, liquid is flooded in the radially inboard liquid annular space 17 (see also trough 80, FIGS. 4C and 7) and the gas from inlet 18 mixes with the liquid from liquid annular space 17 via the siphon 19 to form an emulsification and an emulsified gas-liquid mixture. This emulsified mixture is drawn into microchannel capillary tubes 20.

The capillary tubes 2 run from a radially inboard proximal region to a radially outboard or distal annular space region. The radially distal outlets or output ports of the capillary tubes 20 are disposed somewhere within the pressurized gas storage chamber 24. The distal terminal output ends of the capillary tubes should be along the radially inboard surface of the gas compression housing 12, but the axial terminal positions, relative to the axial input port positions, can be designed based upon the composition of the liquid and the gas, the speed of rotation and other design factors. Each capillary tube is fed with the emulsified gas-liquid mixture from a respective siphon tube or passageway 19.

Figure 2A:
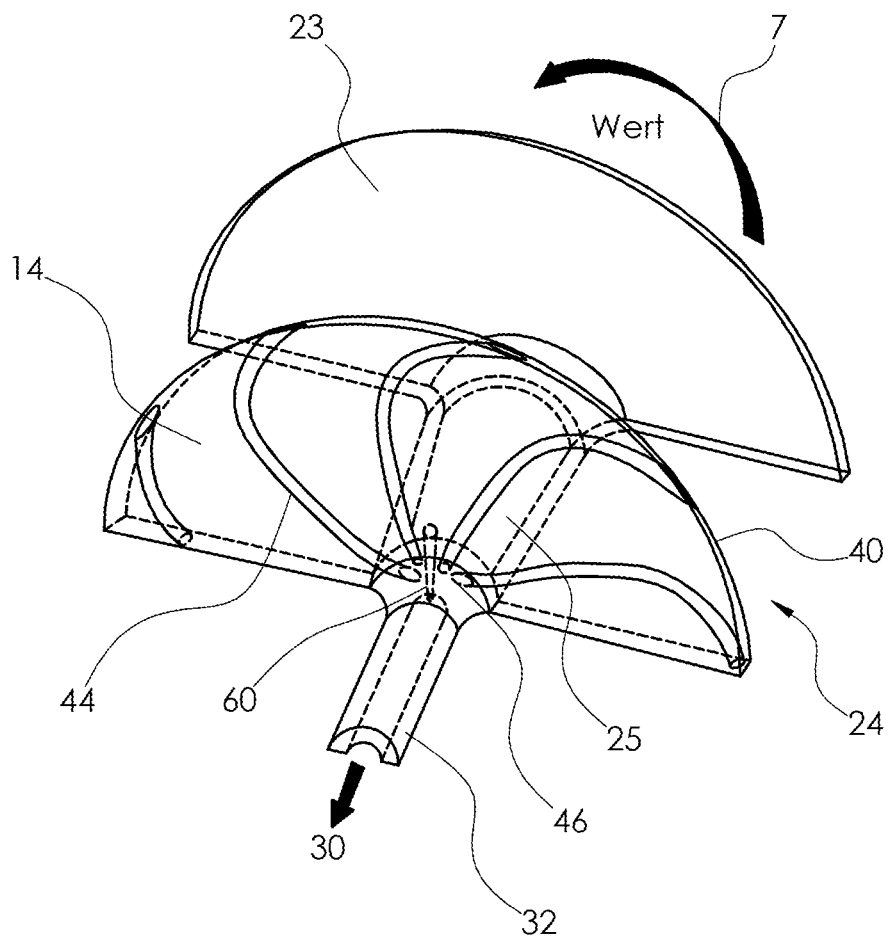
FIGS. 2A and 2B diagrammatically illustrate the energy recovery turbine plate and the pressure plate.

Although FIG. 1 shows a single layer of capillary tubes, multiple layers of tubes can be defined in the radially extending wall of the gas compression housing 12. The capillaries can be formed it a series of discs, coaxially stacked with outer disc ends open to the annular space beneath the annular lake of liquid 4. Further, the siphon passageways to these stacked discs of capillary tubes need not be axially aligned, but may be axially staggered as discussed in the earlier Cherry patent disclosures. There is a one-to-one correspondence of siphon tubes or passageways leading to the capillary tubes. The output ports of the capillary tubes may be located at various axial locations away from the axial location of the radially inboard ports of the tubes 20. The term "axial location" is meant to distinguish components that are spaced along the axis of rotation, for example, gas inlet 18 (FIG. 1) is at an axial location that is spaced apart from the axial location of pressurized gas outlet passage 60 (FIG. 2A).

Capillary dimensions are determined by the inner tube diameter to allow the bubble to seal the tube and to prevent any liquid from finding its way around the bubble. The capillary tubes or passages herein are micro-channels, sized on the order of 3.0 mm to about 0.5 mm. In this way with the micro-channel capillary, the liquid, above the bubble (radially inboard with respect to the gas bubble) must force the bubble to travel the length of the capillary tube and exit at the high pressure end of the tube rather than letting buoyancy force a return of the bubble to the low pressure side of the tube (the radially inboard region of the tube).

The gas compressor housing 12 is rotating and liquid 4 is shown in crosshatch in the right-side portion of FIG. 1. After compression of the gas bubbles in capillary tubes 20, the compressed-gas-liquid emulsion exits the plurality of capillary tubes and the liquid portion of the gas-liquid emulsion forms an annular liquid band or annular lake 4 in the radially distal space on the inboard side of compression housing 12. Near the outlets of capillary tubes 20, the gas-liquid emulsion has more compressed gas than at other locations farther away from the outlets because the emulsion releases compressed gas in the form of bubbles which burst on the surface of the annular lake 4. Sometimes herein the term compressed-gas-liquid emulsion refers this dynamic state of the annular lake 4. The radial height of this annular liquid band or lake 4 is at liquid seal level 42. The annular liquid lake or annular band is shown in crosshatch in the right side of FIG. 1.

Gas is released from the compressed-gas-liquid emulsion annular lake 4 in this radially outer annular space and the compressed gas floats to the nearby open annular space above the annular lake 4 as shown by arrows 27. The compressor acts as a centrifuge which forcibly separates materials by density in a rotary field. Therefore, the gas is released from lake 4 due to this centrifugal action of separation. The gas travels radially inboard as shown by arrows 27 into and through the gas storage chamber 24 and enters pressurized gas passage 60 (shown in FIGS. 2A and 2B). The gas then travels in a hollow tube cavity or passageway within turbine axle 32 and exits the combinatory system 10 at compressed gas outlet 30.

When the liquid level 42 of annular lake 4 reaches a radial height greater than the radially inboard protruding gas-liquid separation hump or dam 34, a portion of the liquid spills over the darn or hump barrier 34 into another annular region which is axially adjacent to the reduced speed energy recovery turbine plate or blade 14. Stated otherwise, the spilt over liquid passes through drain gap 171 (FIG. 1) which gap is defined by the turbine edge and the inboard wall of the housing 12. Although the annular lake in axial space gas chamber 24 is mainly an emulsion, by the time this emulsion passes over the dam or hump 34, most of the compressed, gas has left the emulsion. The result is a liquid with gas solute (gas in solution rather than compressed gas bubbles). Operationally, the emulsion axially adjacent the output of the capillary tubes has more compressed gas bubbles (the compressed gas-liquid emulsion), but as the emulsion moves in the annular lake towards drain gap 171, there is less and less compressed gas due to the compressed gas bubbles leaving the emulsion. Therefore, it is believed that the fluid passing over the dam 34 is mainly gas in a solution with liquid. Therefore the term "spilt over liquid" is used herein. There may be some gas bubbles in this spilt over liquid, but it is believed that the majority of the gas in a solute. The spilled over liquid from hump or dam 34 enters the liquid return inlet 40 of turbine blade 14 and this liquid travels through liquid return tubes or passages 44 which lead radially inboard. See FIG. 2A. Liquid return inlet 40 forms the fluid capture vane for the turbine blade or plate 14. At the proximal, radially inboard position, liquid return tubes 44 form liquid return outlets 46. The liquid return tubes 44 also form capture vanes, downstream of the return inlets 40, which vanes convert kinetic energy into turbine blade shaft torque. The liquid is captured and delivered into central conical chamber 26 formed in the inside of frustoconical spool base 25. The liquid, then returns or is recycled to the radially inboard liquid annular space 17 near siphon passages 19. See FIGS. 4C and 7.

As can be seen in FIG. 1 due to the high level of centrifugal force, the annular lake forms a U-shaped annular liquid seal axially bounded at one end by the radially extending walls of the external housing 12 (these walls generally forming and defining the plurality of capillary tubes therein) and at the opposite axial end by the inboard surface(s) of the external housing 12. However, due to the buildup of pressure by the capture of compressed gas in gas storage chamber 24, this free gas pressure creates the U-shape of the annular liquid seal. The pressurized chamber 24 is axially bounded by pressure plate 23 and by the ERT turbine blade or plate 14. As shown in FIG. 1, the radial extent of pressure plate 23 and turbine plate 14 is substantially the same. The gas liquid separation dam or hump 34 is axially closer to the turbine plate 14 in order to enhance the amount of compressed gas released from the compressed gas-liquid emulsion in annular lake 4. The long axial span of the surface of the annular lake 4 exposed to the compressed gas storage chamber 24 increases the amount of compressed gas given off by the lake. The surface of the lake 4 exposed to the gas chamber 24 is defined by the pressure plate 23 and the turbine plate or blade 14. Although some emulsion spilling, axially over the dam-hump 34 contains entrained gas bubbles (the bubbles in the compressed emulsion), mainly the axial, spill-over is liquid (spilt over liquid) since most of the compressed gas leaves the emulsion annular lake due to the larger axial surface area between dam 34 and pressure plate 23. Primarily liquid enters the liquid return inlet 40 at the turbine blade edge which defines inlet 40.

In order to reduce and transfer heat from the combinatory system 10, internal heat transfer fins 50 are disposed along the radially inboard surface of gas compressor housing 12. These heat transfer fins 5 transfer heat to external heat dissipation fins or fans 52. The thickness, radial height, count and spacing of the fins (the distance the fins extend into gas storage chamber 24) is a matter of design based upon the gas to be compressed, the type of liquid, the speed of rotation and the composition of the components (plastic, aluminum, different type ferrous metal, etc.). Also, the concentric location of the fins is a matter of design.

As explained herein, the gas compression housing 12 rotates in direction 5, causing gas bubbles to be compressed within the liquid-gas emulsion flowing through the plurality of capillary tubes 20, the compressed gas is released from compressed-gas-liquid annular lake 4 into annular space gas storage chamber 24.

FIG. 2A diagrammatically illustrates major portions of the reduced speed energy recovery turbine subsystem. Pressure plate 2, frustoconical spool base 25 and turbine blade 14 are connected together and rotate as a unit in the interior of the gas compression housing 12. A number of liquid return tubes 44 are formed within turbine plate 14. The liquid exits tubes 44 at liquid return outlet 46. Gas from the pressurized gas storage chamber 24 moves from chamber 24 through pressurized gas passage 60 into an interior chamber of axle 32 and ultimately exits through compressed gas outlet 30.

Figure 2B:
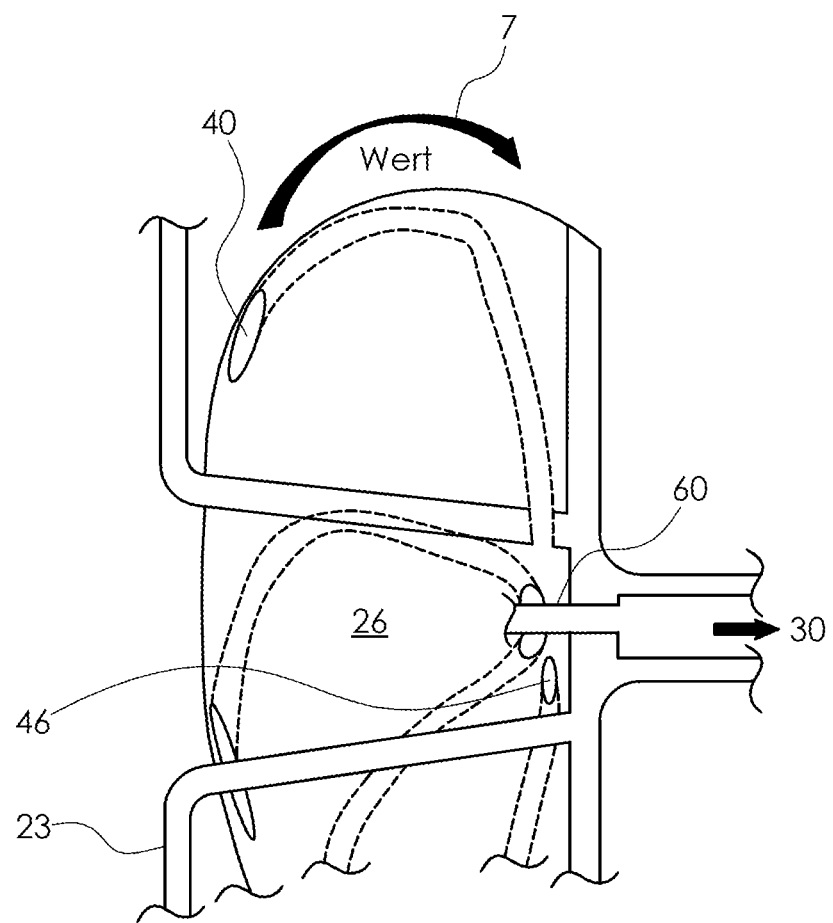

FIG. 2B diagrammatically illustrates details of the pressurized gas passage 60 and the liquid return outlet 46.

Figure 3A:
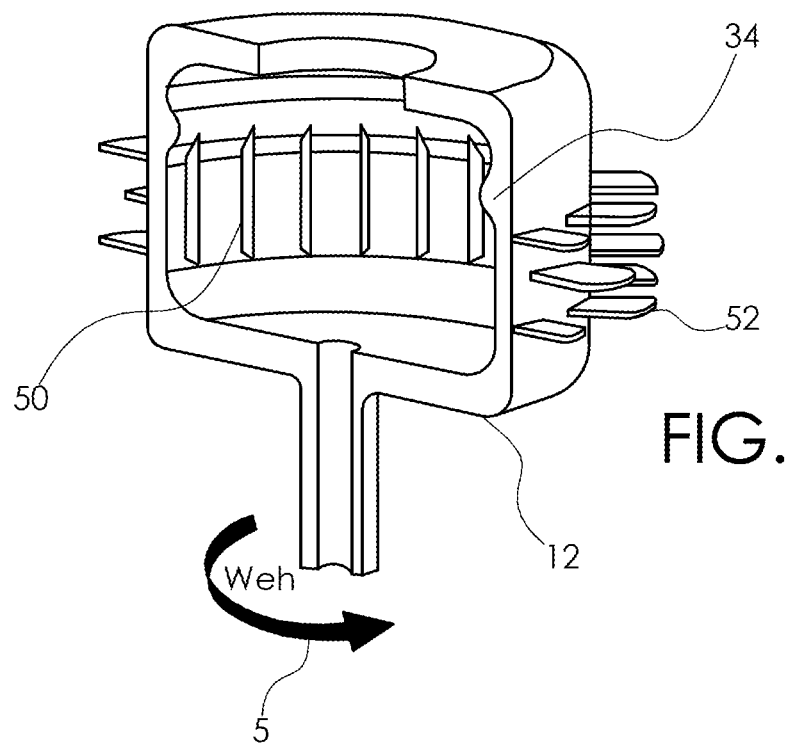
FIGS. 3A and 3B diagrammatically illustrate the rotating external housing.

FIG. 3A shows gas compression housing 12 and the external heat dissipation fins 52.

Figure 3B:
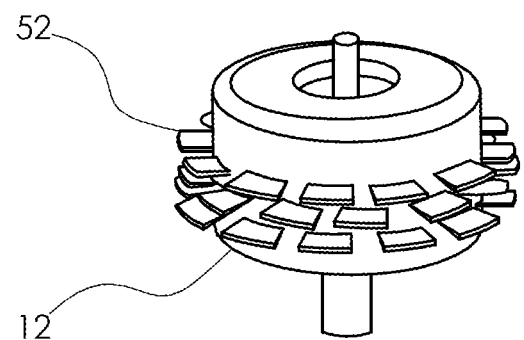

FIG. 3B diagrammatically shows the outside of the gas compression housing 12 with external fins 52.

Figure 4A:
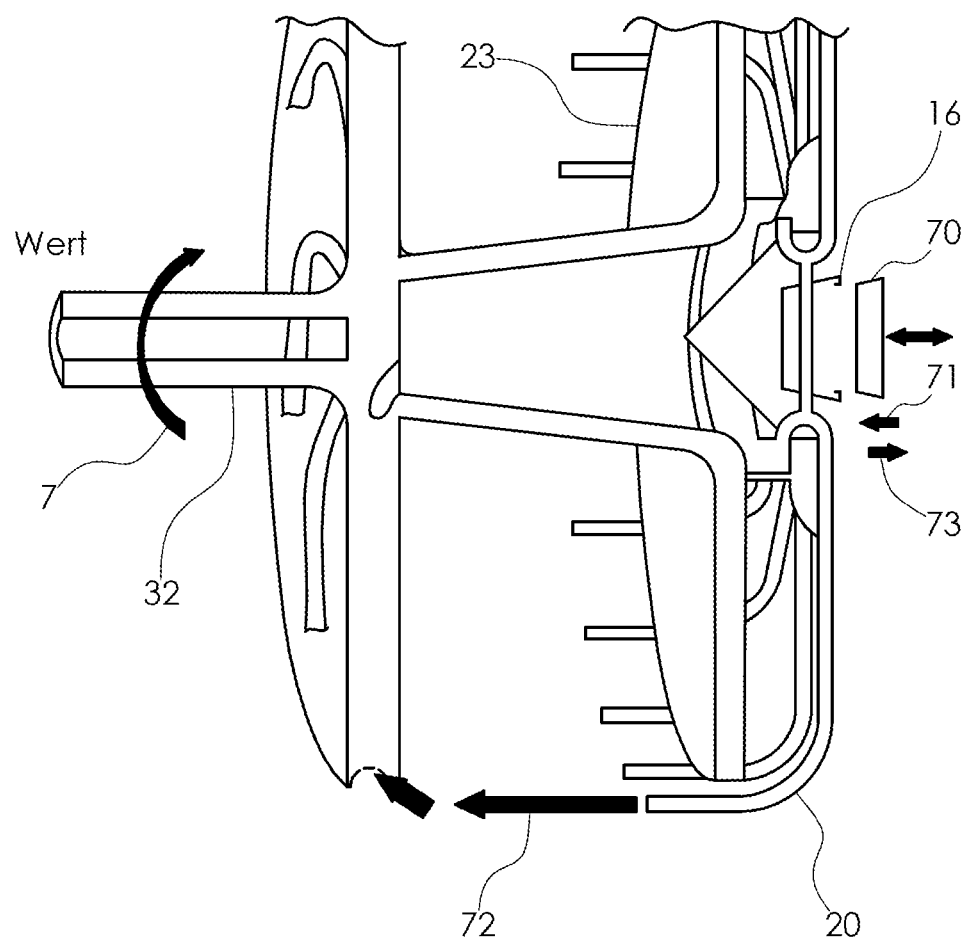
FIG. 4A diagrammatically illustrates a gas inlet stopper used to initially control gas fed into the gas inlet which is part of the emulsification device for the gas-liquid emulsifier which feeds the gas-liquid mixture into the capillary tubes, and also illustrates liquid flow into the liquid return inlets in the turbine plate.

FIG. 4A shows a gas inlet stopper 70 that, during startup, is moved axially inboard to partially close gas inlets 18. The stopper moves during startup axially inward as shown by arrows 71. During operation, stopper 70a is moved axially outward in direction 73. FIG. 4A also shows liquid circulation loop 72.

Figure 4B:
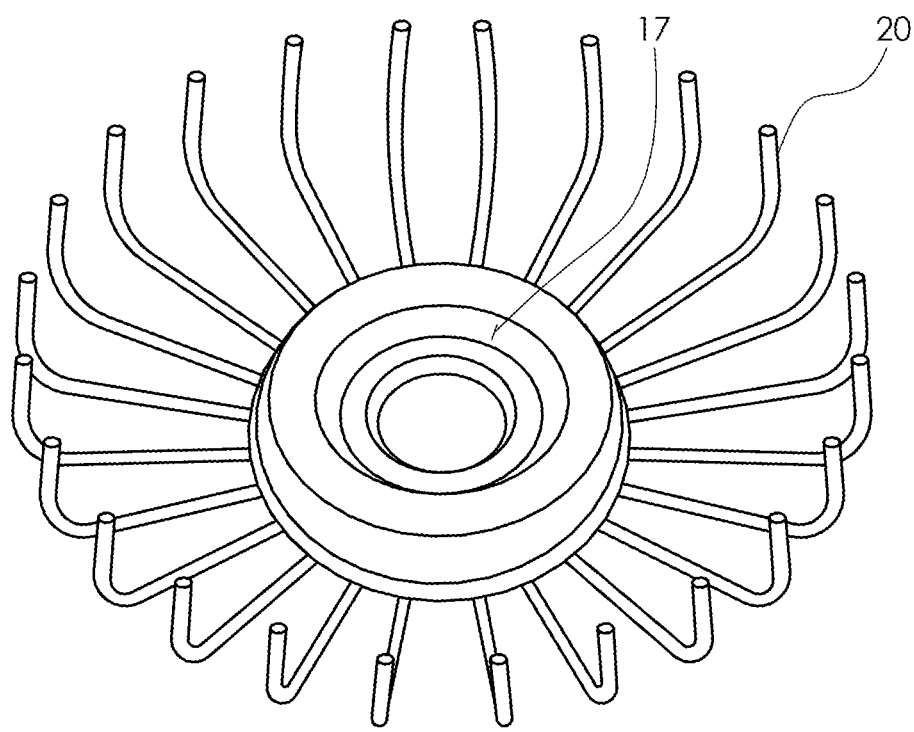
FIG. 4B diagrammatically illustrates the capillary tubes.

FIG. 4B shows details of the capillary tubes 20 and the radially inboard liquid annular space 17.

Figure 4C:
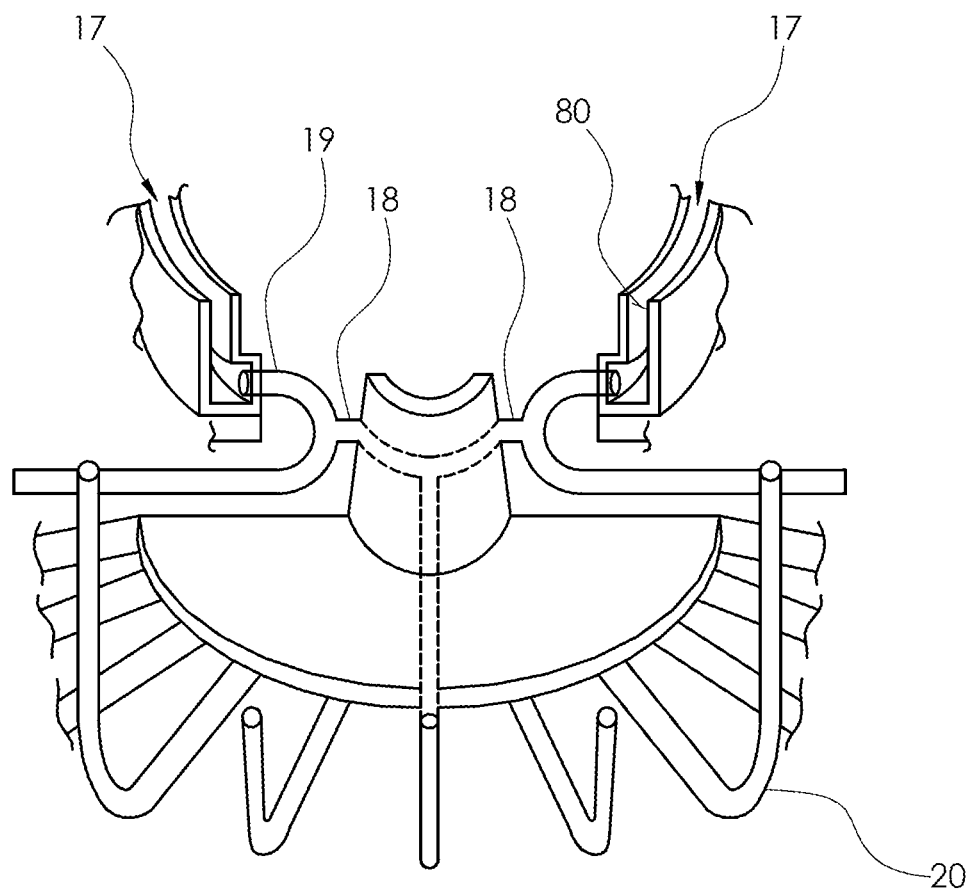
FIG. 4C diagrammatically illustrates the siphon and the trough which creates the pressure differential causing the siphon to pull gas from the gas inlet as part of the emulsification sub system.
Figure 7:
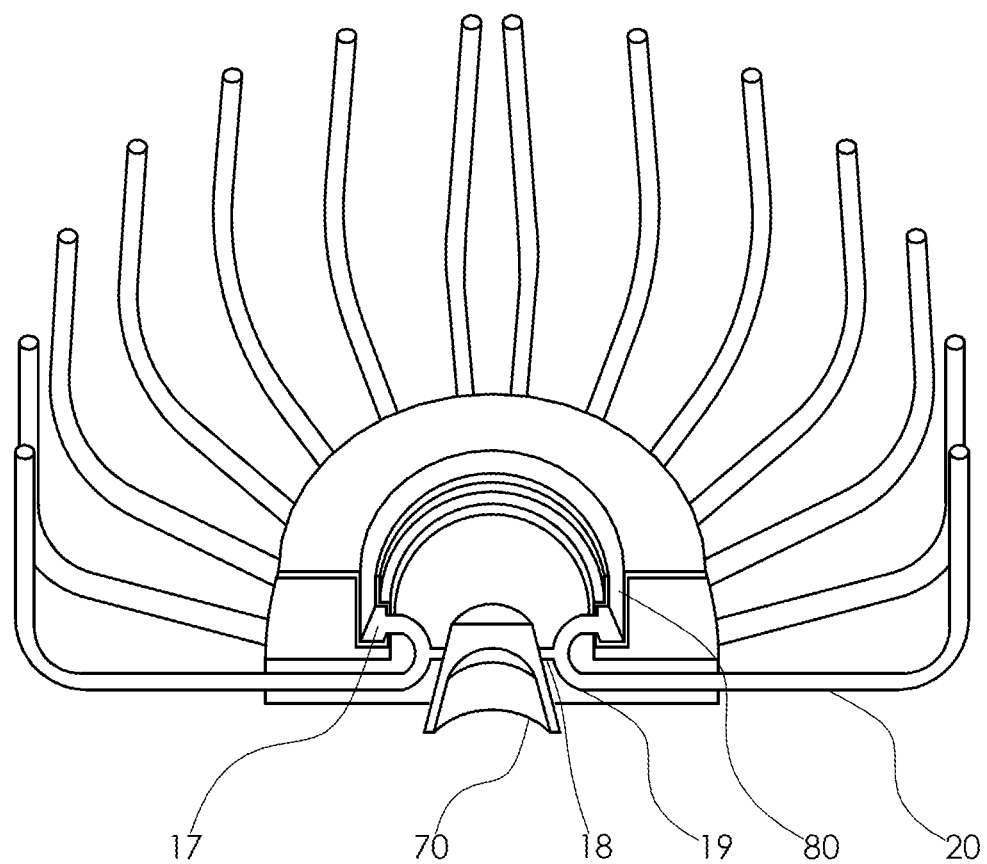
FIG. 7 is a detailed view of the siphon, the trough and the capillary tubes.

FIGS. 4C and 7 show a plurality of capillary tubes 20, gas inlet 18 leading to U-shaped siphon line 19, the output portion of the siphon line 19 being the input of capillary tube 20. Also trough 80 is shown in radially inboard liquid annular space 17. The input ports of the capillary tubes are at the interface or intersection of the output of gas inlet passage 18 and the bottom of the U-shaped siphon tube 19. The other input leg of the U-shaped siphon tube 19 leads to the radially inboard liquid annular space 17.

Figure 5A:
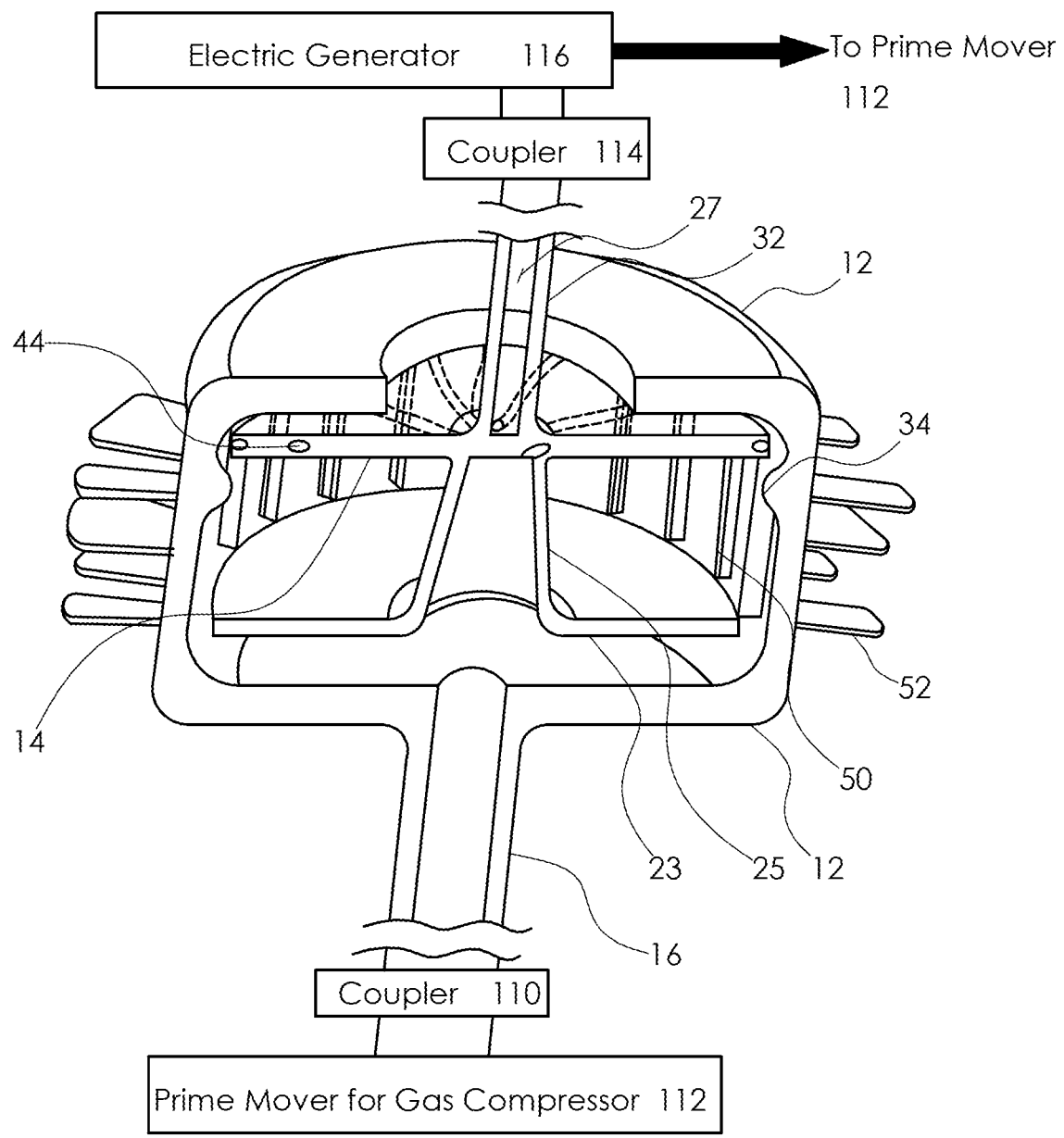
FIG. 5A diagrammatically illustrates the rotating gas compressor housing connected to a prime mover and the energy recovery turbine system connected to an electric generator.

FIG. 5A shows compressor exterior housing 12 mechanically coupled to coupler 110 and ultimately coupled or connected to prime mover 112. Within the interior of gas compression housing 12, is the turbine subsystem formed by pressure plate 23, frustoconical spool base 25 and turbine plate or blade 14. Axle 32 of the turbine subsystem is coupled via coupler 114 to electric generator 116. The electrical output of electric generator 116, after being subject to a power signal conditioner, is supplied to prime mover 112.

Figure 5B:
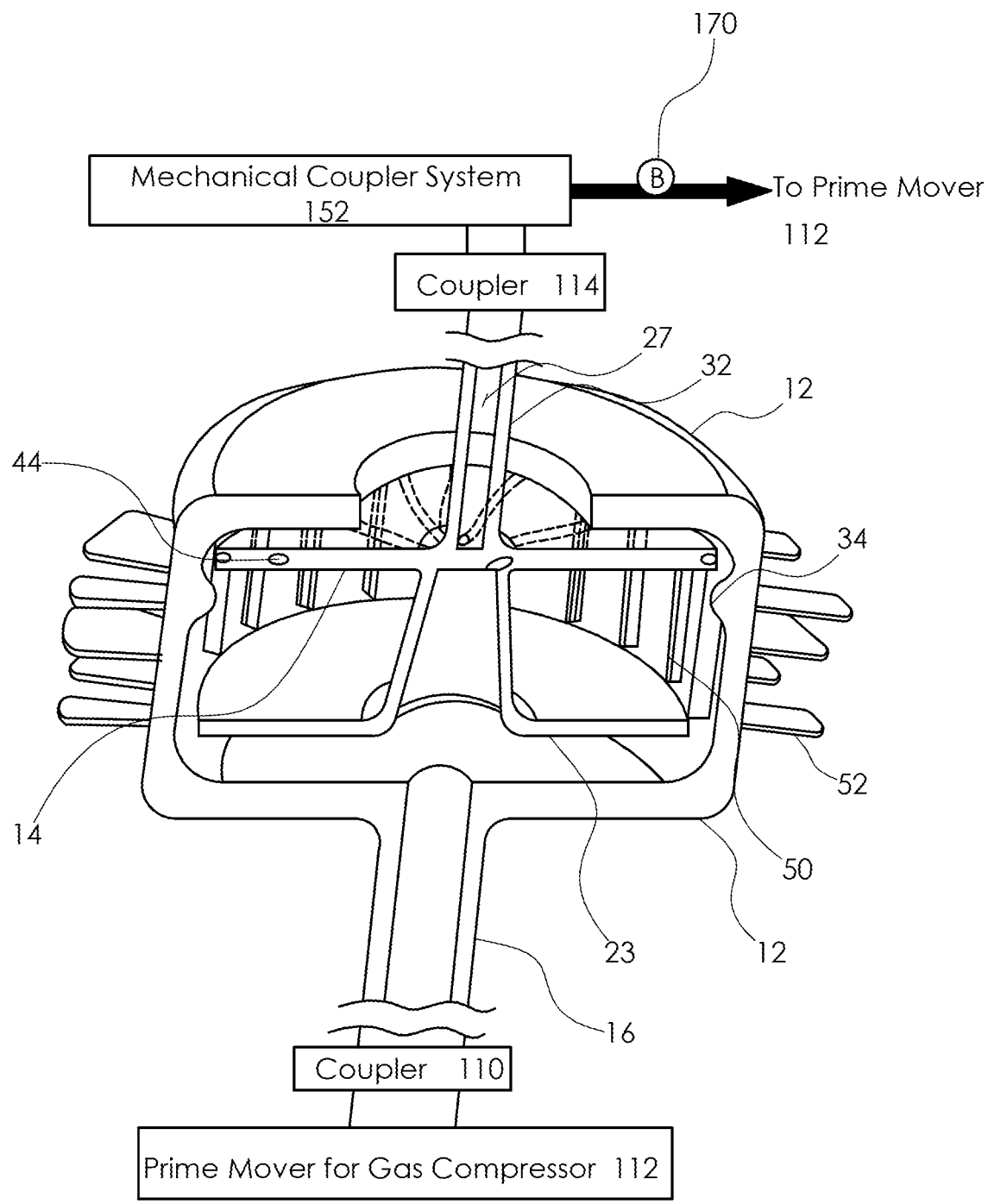
FIG. 5B diagrammatically illustrates a mechanical coupling subsystem between the energy recovery turbine and the prime mover.

FIG. 5B shows the gas compression housing 12 with the interior turbine subsystem disposed therein and a turbine subsystem axle 32 connected to coupler 114 and coupled to another mechanical coupler system 152. Mechanical coupler system 152 may be a series of gears or belts or other mechanical transmission systems which are ultimately mechanically connect to prime mover 112.

Figure 6:
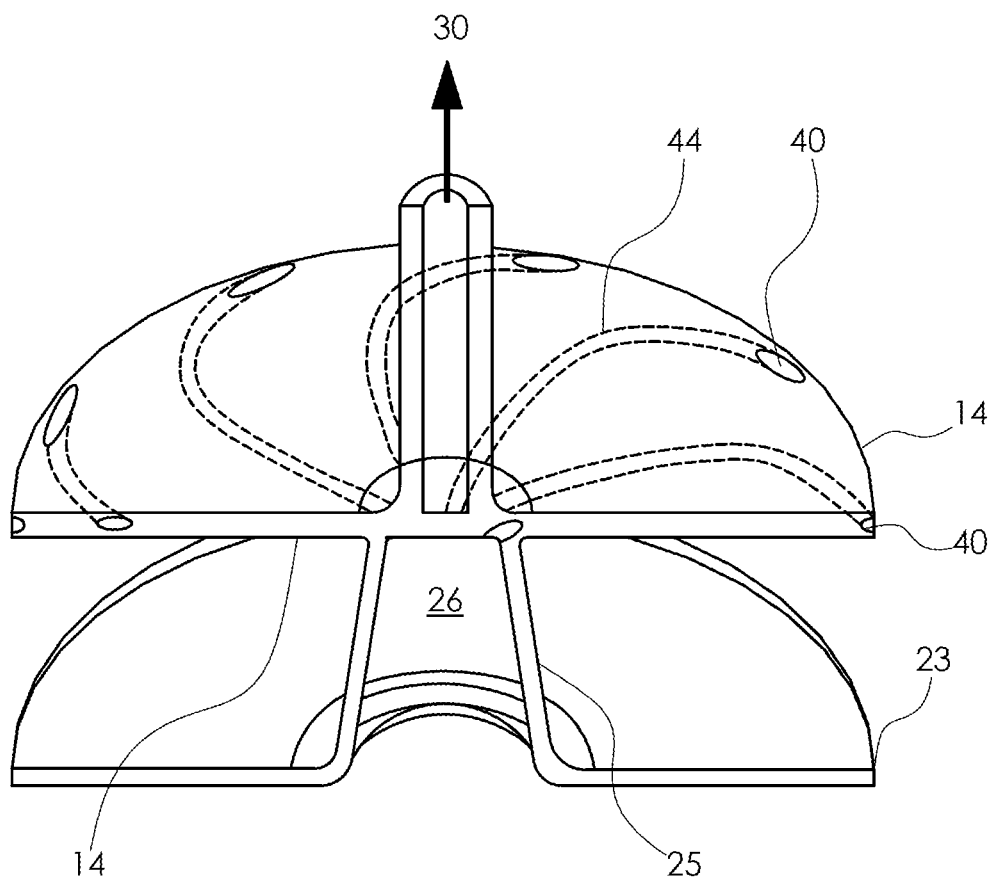
FIG. 6 diagrammatically illustrates the continuously curved arc shape from a radially distal leading edge at the turbine blade input to a radially inboard trailing edge for the energy recovery turbine plate channels or blades, the continuously curved arc shape may be a plurality of blades or a plurality of passages.

FIG. 6 diagrammatically illustrates the turbine subsystem including pressure plate 23, frustoconical spool base 25 and turbine plate or blade 14. Liquid enters liquid return inlets 40 which leads to liquid return tubes or passages 44. Liquid exits passages 44 and is delivered into the interior of frustoconical chamber 26.

FIG. 7 diagrammatically shows a plurality of capillary tubes 20 having radially inboard inlets or input ports at the intersection of the gas passage 18 output and suction line 19. The U-shaped suction line is, at its base, fluidly coupled to gas inlet 18. The other end of U-shaped suction line 19 is open to a trough 80 formed within the radially inboard liquid annular space 17. A gas stopper 70a opens and closes the inlet to gas inlet 18.

Figure 8:
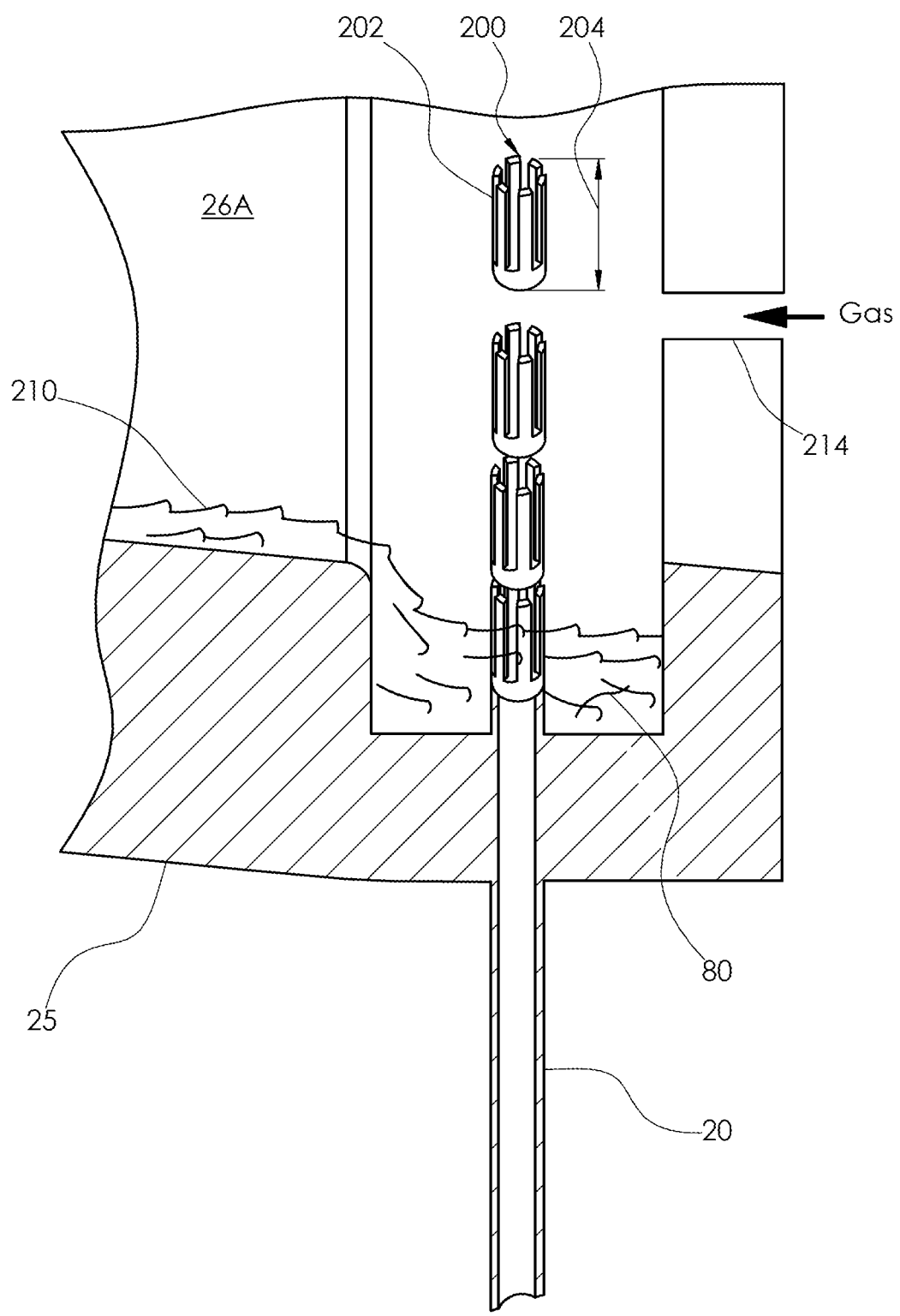
FIG. 8 diagrammatically illustrates castellated tubes as the emulsifier for the gas-liquid emulsification fed into the capillary tubes.

FIG. 8 shows castellated tube ends at the capillary input ports. These are described later.

System Operations—Liquid Energy Conservation

If liquid energy is conserved and Bernoulli's equation states that the energy of a liquid (ignoring losses due to friction in the form of heat) at any given location in a system is $$H = z + \frac{p}{pg} + \frac{v^2}{2g} = \text{constant}$$

Where:
a. H=the total liquid energy head, or more simply, head
b. z=the elevation head: For the purposes of the centrifugal device being discussed here, the radial distance from the axis of its rotation.
c.

$\frac{p}{pg} =$ the pressure head: pressure/(liquid density×acceleration due to gravity).

d.

$\frac{v^2}{2g} =$ the velocity head: velocity squared/(2×acceleration due to gravity).

e. For the purposes of the centrifugal device being discussed here, g is replaced with a multiple of g which is dependent upon the angular acceleration of the liquid rather than acceleration due to gravity.

If the head in a liquid stream must remain constant at any point in the stream and the system slows the angular velocity from Weh to Wert, the energy is shifted to the z component of the term and the liquid is lifted towards the axis of rotation.

The Rotating Bodies

This device is primarily comprised of two independently rotating bodies (see in the Figures, Weh 5 and Wert 7), an external rotating compressor housing 12 and an internal energy recovery turbine plate 14. Both bodies 12, 14 rotate in the same direction during operation, with the external rotating housing 12 being driven by the prime mover (angular velocity=Weh, direction 5) and the energy recovery turbine 14 rotating through the primarily conversion of angular momentum in the liquid to torque and some liquid friction and at a slower rate (angular velocity=Wert (direction 7)). The turbine 14 is connected to an electrical generator (not shown in FIG. 1, but coupled to rotating shaft 32), to convert the shaft torque to recovered electrical energy.

This electrical power generator can be regulated to slow the ERT turbine 14 just enough to lengthen the column of liquid (see liquid return line 44) in the turbine runners to the inboard discharge nozzles (liquid outlet 46), thus enabling the return of the spent water to the inlet of the compressor impeller to start the next compression cycle. The liquid discharged from outlet 46 is fed into central conical chamber 26 which, via siphon 19 is used to create an emulsion due to gas passing through inlet 18, then by a siphon effect, the emulsion is fed into the inlet of the capillary compression tubes (one tube shown as capillary tube 20). This recovered electrical energy from the generator (see FIG. 5A), driven by turbine 14 and shaft 32, can be feed directly back to the prime mover or to the electrical grid system (not shown), thus reducing the total energy consumed by the compressor operation.

The device can be operated with the axis of rotation either horizontally or vertically oriented. The two main bodies 12, 14 are independently supported or joined using bearings as long as they are capable of independent rotation. This operation is analogous to the operation of a fluid coupler, and the Foettinger principle. The energy imparted to the liquid by the impeller is present in the angular velocity/angular momentum of the liquid exiting the impeller, this high energy liquid then enters the turbine at the largest diameter and transfers this rotational energy to the turbine as its angular momentum/velocity is converted back to shaft torque as the liquid slows down. (at the center of rotation angular velocity/momentum equals zero).

At any given RPM, the energy in the liquid is directly related to its radial distance from center, the further away from center, the higher the energy content of the liquid (assuming no slip between the rotating apparatus and the liquid). So, by definition, the energy of the liquid must decrease as it approaches the center of rotation if the liquid is constrained by radial passageways to rotate at the speed of the energy recovery turbine. Without the physical constraint of the turbine passageways, the conservation of momentum would cause the angular velocity to speed up as the liquid traveled closer to the center of rotation. With the physical constraint of the radial passageways, the conservation of energy causes the reduction of angular momentum to be converted to shaft torque.

The bubble compression device 12, 20 and radially formed annular lake 4 with the ERT turbine 14 contains a fixed amount of liquid to use for compression. Under some operating, conditions, there may be a need to utilize an exterior fluid holding tank to accept the change in volume of the liquid from low pressure to high pressure in the storage chamber.

An auxiliary storage chamber or liquid reservoir is external and is stationary relative to the compressor 12. One example of such an auxiliary store uses a scoop in the drain race side liquid seal positioned in such a way as to remove any excess water/liquid as the center gas storage area liquid was displaced away from center. The scoop may be designed such that the liquid seal never reaches the ID (inner diameter) of the drain race and thus prevent spillage. In a similar fashion, a float controlled port located in the drain race may add or supply additional water/liquid when the drain race liquid seal level moves away from, center, indicating a need for more liquid. The float or surface ski would keep the refill tube shut and prevent it from adding liquid until the surface dropped away from the port and the float or ski would open the port allowing liquid to enter the drain race until the height of the drain race was returned to design level.

The liquid is recirculated through the compression process but remains contained within the external housing 12. Centrifugal force pushes the liquid to the outside of rotation, distally with respect to the axis of rotation. The liquid return tubes 44 are continuously curved arc shapes from a radially distal leading turbine edge 40 at the blade or passageway input to a radially inboard trailing edge 46 or blade output. Tubes 44 are defined, in this embodiment, in the energy recovery turbine 14 which turbine rotates relatively slower than the rotating external housing 12. The liquid in annular lake 4 drives the turbine blade 14. The continuously curved liquid return tubes 44 in blade 14 convert the kinetic energy/angular momentum into potential energy/shaft torque by "lifting" the liquid back to the center of rotation and converting the angular momentum of the liquid to torque by slowing down the liquid. Rather than tubes 44, turbine blades which are continuously curved may scoop up the spilt over liquid at the drain gap 171 and drive the turbine 14.

If the differential in the rotational velocities of the external housing 12 and the energy recovery turbine blade 14 is sufficient, liquid is returned to the center conical chamber 26 of the combinatory system 10. Controlling the velocity differential controls the return liquid flow rate.

An emulsion creation device feeds a series of radially oriented compression tubes 20 as described in the Cherry '807 and '261 disclosures.

The emulsion creation device in this embodiment is novel in that it employs individual siphons 19 rather than jets or pressurized sprays. Each capillary tube is supplied with emulsion from a respective siphon subsystem. The features of the siphon device 19 include a trough 80 (FIGS. 4C and 7) to keep the liquid surface at the correct level for the siphon tube entrance. As an alternative to the siphon emulsifier, castellated tubes may be used rather than U-shaped siphon subsystems.

The siphons 19 work by forcing the liquid to be lifted above (proximally closer to center axis of rotation) the weir controlled liquid level in the circular trough 80 (FIGS. 4C and 7). The weir formed in trough 80 is a small distally extending radial wall which builds up a pool of liquid in the trough 80 to, regulate flow through siphon passage 19. The pool of liquid feeds the siphon emulsifier systems. The trough 80 (FIGS. 4C and 7) is part of the radially inboard liquid annular space 17 (FIG. 4B).

In a centrifugal force field, the negative pressure increases rapidly. This negative pressure is created by lifting this centrifugally enhanced, high density compression fluid above the atmospheric liquid level in the trough 80. The pressure in siphon 19 is below 1 ATM.

In a water-based system, the negative pressure can increase such that gas in the water "boils out" and leaves the water.

As the radially outboard extent, depth or distance of the weir increases (the relative distance or height of the weir trough wall compared to the axial centerline of rotation), the weir controlled liquid pool level increases (the greater liquid level in trough 80), the absolute pressure of the liquid decreases and a precision orifice strategically located in the sub-atmospheric pressure region of the siphon 19 (for example, at the bottom of the U-shaped siphon, or stated otherwise at the most proximal, radial location of the U-shaped siphon), draws in gas from the gas passage due to the pressure differential. The gas provided through gas inlet 18 and gas intake 16 creates a gas-liquid emulsion at the inlet/siphon interface, which interface is effectively the input port of the corresponding capillary tube. Moving the orifice at the "point of siphon" of siphon 19 (in FIG. 7, the bottom of the U-shaped siphon passage 19 at the interface of gas inlet 18 and siphon 19) closer to the axial centerline of rotation increases the differential pressure between the gas in the inlet 18 and the liquid in the weir trough 80 and causes more gas to be drawn in and emulsified with the liquid in siphon passage 19. Contrarywise, the closer the orifice/siphon interface is moved towards the pool liquid level in the trough 80 (the interface moved radially outboard), the less gas is drawn into the liquid emulsion. Moving the point of air entry to the relative to the equilibrium atmospheric liquid surface level in the trough changes the differential pressure and thus the air flow.

It should be noted that other siphon shapes and designs (other than a U-shaped siphon) may create the emulsion that is supplied to each respective capillary tube. Given certain liquid and gas combinations and operating conditions any type of structure forming a siphon action may be utilized. Further, the gas inlet 18 may be located at some other location along the axially forward end (axially nearer gas intake 16) or the axially rearward end (axially nearer compressed gas outlet 30).

This design feature can be used to adjust and regulate gas flow through the compressor to match or meet the demand for compressed gas from the system while leaving the compressor RPM at a constant to maintain desired or target pressure.

Compressed gas is captured in gas storage chamber area 24 which chamber is enclosed at one axial end by the pressure plate 23, at its distal end by the wall forming conical chamber 26, and at its other axial end by the energy recovery turbine wall or plate 14 and the liquid seal 40 created by centrifugal force. The liquid seal 40 is formed as the surface of annular liquid lake 4. As illustrated in FIG. 1, the axially forward and rearward liquid seal levels 42 which are axially outboard of pressure plate 23 and turbine plate 14 are substantially at the same radial distance away from the axial centerline of system 10, but the compressed gas in chamber 24 defines the surface of the annular lake 4 at a radially distal position relative to the liquid seal levels 42. Therefore in operation, the liquid seal is U-shaped, with the annular lake forming the radially distal portion of the U-shape and the U-legs forming the liquid seal levels 42.

This captured pressurized gas in chamber 24 moves from the gas storage area 24 through ports to the compressed gas outlet 30. FIG. 1 shows the movement of gas along the arrows 27. FIG. 2A shows pressurized gas passage 60 leading between storage chamber 24 (FIG. 1) and gas outlet 30 formed in shaft 32.

The heat of compression is transferred from the gas to the liquid in the compression tubes while mixed as an emulsion. This captured heat must be removed from the system for it to reach Thermostatic equilibrium. The rate of heat transfer through an aluminum compressor housing is insufficient to carry the 500 watts per CFM heat of compression through the wall of the compressor (the C-heat due to compression varies with the final pressure). Therefore, a large number of microtubular "U" shaped tubes are necessary to allow the maximum rate of heat transfer. The inner dimension of these tubes are smaller than the liquid boundary layer film that typically exists in conventional radiator design and therefore prevents the diffusion-limited heat transfer rate thermal barrier that is found in current state of the art radiator channels. Additionally, these tubes are treated to create a super-hydrophilic surface to minimize wetting angle and hydraulic friction inside the tubes.

The microtubular hybrid fin/fan system should maximize surface area, minimize air side boundary layer thickness. This microtubular hybrid fin/fan system is explained in a report entitled "A Fundamentally New Approach to Air-Cooled Heat Exchangers" Sandia Report # SAND2010-0258. The microtubular hybrid fin/fan system forces enough air across this large surface area to carry away the heat of compression with minimal ΔT. As a rule of thumb, the smaller the ΔT, the larger the surface area must be to dissipate the heat flow. These external hybrid fin/fan "U" shaped microtubes are fixed to the outside of the external rotating housing and are arranged in, a manner wherein they act as fan blades 52 and force air past the surface of the external heat fins/fans. Additionally, these microtubular fin/fans are designed in such a way as to promote liquid flow through the microchannel heat exchanger to maximize the rate of heat transfer between the air external to the dual rotating housings 12, 14 and the liquid.

FIG. 8 diagrammatically illustrates the use of radially inboard extending castellated tubes 202 acting as the emulsification devices for creating emulsified gas-liquid which is fed into the inputs of each capillary tube 20. The annular conical interior space 26 of spool 25 has an axial region 26a near the gas intake 16. FIG. 8 shows, as an illustration, gas passage 214 which is fluidly open (that is, gaseously open) to gas intake 16 (see FIG. 1). A gas flow control is not shown but maybe similar to the gas flow control shown in FIG. 4A.

The radially inboard terminal end of each capillary tube 20 terminates in a castellated tube 202. Each castellated tube has a number of slots, grooves or cut-outs 202 through which gas is sucked into the tube 200 by the recycled liquid 210 running along the radially inboard wall of the frusto-conical spool base 25. The recycled liquid (that is, the spilt over liquid picked up by the blade passages) exits the liquid return outlets 46 of the turbine blade and is radially forced to the inboard surface of the conical chamber 26 of the frustoconical base 25 (see FIG. 1). Due to the radially wider axial end 26a of the conical chamber 26 (see FIG. 8) which is axially proximal the capillary input ports, the recycled liquid is axially forced towards trough 80. The spilt over liquid flow 210 in the axial end of conical chamber 26 then partly fills trough 80. Due to the rotation of the housing 12, this spilt over liquid flow 210 in trough 80 is fed into the input ports of the capillary tubes 20 and the castellation slots 202 capture and draw gas from axial region 26a into the capillary tubes 20 creating a gas-liquid emulsification which is fed into capillary tubes 20.

During the course of testing the siphon emulsion entrance, one of the configurations tested was with the siphon cap removed, leaving only the compression-capillary tube surrounded by a slotted spacer tube that held the siphon cap concentric with the center-line of the compression tube. The slots in the spacer tube were intended to allow liquid to flow between the compression tube and the siphon cap.

In the prior art, the Taylor centrifugal gas compressor suggested as simple spill over lip leading to some gas compression chambers. However, Taylor did not use capillary tubes.

One operational theory tested showed that an adequate gas-liquid emulsion could not be created solely with very small compression-capillary tube entrances given the surface tension of water in trough 80.

However, when the compression-capillary tubes were terminated with radially inboard extending castellated tubes, the liquid suction through the castellated entrance ports or slots of the capillary tubes did entrain air in similar fashion as when the siphon cap was used. This use of castellated tube ends 200 was an unexpected result. The amount of air visible in the compression tubes 20 appeared to vary with water level in the trough 80 behind the wier. At low water levels, a small amount of air was visible in the compression tube. As the water level increased, so did the density of air bubble concentration or discreet bubble count in the compression tube up to a certain point. With further increases of water level, the bubbles decreased until the entrance appeared to be flooded and only water was visible in the compression tube. It was observed that this variation of air vs water flow followed a bell type curve.

The castellated tube 200 was constructed by dividing the OD of the tube into six segments and then removing the material of every other segment. This produced a castellated entrance with three spaces for water to enter separated by three 60 degree segments of solid tube wall. These physical wall obstructions or wall teeth blocking to water flow are believed to create a turbulent eddies from each side of the wall segments, producing counter rotating vortices that meet near the center-line of the solid segments. A gap between the solid segment inner walls and these vortices seems to induce air or gas into the water. As the water or liquid level rises in the trough 80, a point is reached where the vortices stop inducing air or the induced air can bubble back to the radially outboard surface and escape before the water flow can draw the bubbles into the compression tube. This cessation of air inducement may be referred to as a "flooded entrance" once the air is no longer able to be carried into and along the length of the compression-capillary tube. The radial extent of slot 202, is a "slot length" and the slot length ratio may be 2 times D where D is the ID of the castellated tube terminus 200.

Operational Descriptions

The device starts in a still condition, with the interior floor (radially inboard liquid annular space 17) of the gas compression housing 12 flooded by the liquid and the gas inlet ports blocked. FIG. 4A shows gas inlet stopper 70 that travels along the axial centerline to predetermined axial positions to close (at least partly) and then open gas inlet ports 18. The external housing 12 is driven by the, prime mover and the energy recovery turbine 14 is free to spin independently, driven only by friction from the liquid between the two bodies 12, 14. As the device starts spinning (driven by the external housing 12, the internal recovery turbine driven by fluid flow), centrifugal force starts the siphon process in the emulsion creation device and the flooded siphons 19 begin to pull liquid from the center or the trough 80 (FIGS. 4C and 7), radially through the compression tubes 20, and deposit the emulsion with the compressed gas against the internal wall of the external, compressor housing 12. This forms the annular liquid lake 4 shown in crosshatch in FIG. 1.

If the energy recovery turbine blade 14 is permitted to rotate at the same rate as the external housing 12, all of the liquid will move to the outside of rotation and remain there. However if the energy recovery turbine 14 is actively braked (slowed) in a controlled manner, the liquid is lifted back to center for reuse. See FIG. 1, seal level 42.

Once a liquid-only steady state is reached, that is, the external housing 12 is at operating speed and the energy recovery turbine 14 is braked sufficiently to drive the desired liquid flow rate through the device, the gas inlet ports 18 in the siphons 19 are opened to the gas atmosphere in the gas intake shaft. The ports 18 are opened by the axial withdrawal of the gas inlet stopper 70 away from the axial position of the gas inlet ports 18. The centrifugally enhanced liquid siphon pulls gas from the gas inlet ports 18, mixes the gas with the liquid from the trough 80 and delivers the emulsified gas/liquid mixture into the compression tubes 20.

While in the capillary tubes, the emulsified gas/liquid mixture and forms a bubble train, thus beginning the isothermal compression process described in Cherry '807 and '261.

The gas/liquid emulsion moves from the radially distal ends of the compression tubes, along the interior wall of the external housing 12, from the emulsion creation device towards the radially outer edges (distally) of the energy recovery turbine blade 14. The liquid/gas emulsified mixture passes over one or more decreased diameter sections the gas/liquid separation humps 34 extending radially inward from, the inboard surface of the external housing 12, to promote gas bubble separation from the liquid before the compressed emulsified mixture reaches the energy recovery turbine blade 14 and leaves the pressurized gas storage area 24.

Separated gas collects in the gas storage area 24, sealed in by the liquid column (see seal level 42 of annular lake 4) on the outside walls of the energy recovery turbine 14 and the pressure plate 23. Pressurized gas leaves the device by passing through the chamber 24 (see arrows 27 in FIG. 1) and the pressurized gas passages 60 (FIGS. 2A and 2B), these passages 60 joining the pressurized gas storage 24 area with the compressed gas outlet 30 formed in shaft 32, from which the gas is harvested.

Separated liquid split over the dam 34 is collected and returned, to the start of the cycle by means of a pattern of liquid return tubes 44 embedded within the walls of the energy recovery turbine blade 14. Liquid return tubes 44 have continuously curved arc shapes from a radially distal leading edge at the blade or passageway input to a radially inboard trailing edge or blade output. Given the relative angular velocity difference between the external housing 12 and the energy recovery turbine 14, wherein the energy recovery turbine velocity is always slower, results in the liquid return tubes 44 acting as forward facing pilot tubes relative to the faster moving oncoming liquid stream and lifting the liquid back to center (hydraulically up for radially inboard flow). If the differential in the rotational velocities of external housing 12 and energy recovery turbine 14 is sufficient, liquid is returned to center conical chamber 26 of energy recovery turbine 14. Controlling the velocity differential thus controls the return liquid flow rate, and therefore the compressed gas flow production by the compression device. Liquid return tubes outlets 46 deposit or deliver the liquid on the hydraulically high end of conical central chamber 26, where centrifugal force resumes control and moves it back to the siphon trough 80 to start the process again. Rather than siphons in trough 80, the capillary tubes can terminate in castellated ends radially protruding inward into trough 80.

Rather than recover the kinetic energy from the spilt over liquid from the annular lake 4, the gas compressor discussed hereinabove can be configured to recycle liquid and omit the energy recovery. In this manner, during start-up, the turbine is braked by brake B170, FIG. 5B, and the mechanical coupled or transmission 152 to the prime mover 112 is omitted (or the prime mover coupling is detached). If the turbine blade 14 is permitted to rotate at the same rate as the external housing 12, all of the liquid moves to the outside of rotation and remain there. In the liquid recycle machine, if the turbine 14 is actively braked (slowed) in a controlled manner, the liquid is lifted back to center for reuse. See FIG. 1, seal level 42. Once a liquid-only steady state is reached, that is, the external housing 12 is at operating, speed and the turbine 14 is braked sufficiently to drive the desired liquid flow rate through the device, the gas inlet ports 18 in the siphons 19 are opened to the gas atmosphere in the gas intake shaft. Therefore, brake B170 has a variable braking or control effect on the axially extension 27 of the spool formed by turbine blade 14, base 25 and pressure plate 23.

The claims appended hereto are meant to cover modifications within the scope and spirit of the present invention.

What is claimed:

1. An energy recovery system for a gas compressor having an input axle rotated by a prime mover, comprising:

the gas compressor including a substantially hollow cylindrical housing rotatably driven by the prime mover, the rotating hollow cylindrical housing having an inboard surface distal to an axis of rotation and proximate to an annular chamber formed within the hollow cylindrical housing;

a turbine rotatably positioned inside the annular chamber and rotating independent of the rotating hollow cylindrical housing, the turbine having an output axle;

the annular chamber defining an annular compressed gas chamber and containing an annular lake of liquid and compressed gas formed by the gas compressor;

the turbine being configured to capture the liquid from the annular lake to return the liquid to an inlet of the gas compressor and to convert one or both of an angular velocity and an angular momentum of the liquid in the annular lake into turbine shaft torque applied to the output axle.

2. An energy recovery system for a gas compressor as claimed in claim 1, wherein:

the turbine having one or more turbine blades, the turbine including a pressure plate at one axial end and the one or more turbine blades at another axial end, the pressure plate and the one or more turbine blades having substantially the same radial extent and forming the annular compressed gas chamber therebetween;

the annular lake forming a liquid seal between the pressure plate and the one or more turbine blades, the annular lake having an axial length between the pressure plate and the one or more turbine blades and a radial lake depth therebetween which depth is greater than a radial space between the one or more turbine blades and the inboard wall of the hollow cylindrical housing;

a dam beneath the annular lake protruding radially inboard from the inboard surface of the hollow cylindrical housing, the radial height of the dam being less than the radial depth of the annular lake;

a portion of the liquid in the annular lake spilling over the dam as spilt over liquid; and the spilt over liquid driving the one or more turbine blades.

3. An energy recovery system for a gas compressor as claimed in claim 2, wherein:

the turbine including a plurality of fluid capture vanes radially, distally extending into the spilt over liquid, the fluid capture vanes including a plurality of continuously curved arc passageways between the spilt over liquid and a radially inboard location.

4. An energy recovery system for a gas compressor as claimed in claim 3, wherein:

the turbine includes a hollow coaxial frustoconical base between the one or more turbine blades and the pressure plate;

each the continuously curved arc passageways fluidly coupled to a central conical liquid collection chamber defined inside the hollow coaxial frustoconical base;

a radially inboard liquid annular space axially located near the pressure plate and at one axial end of the central conical liquid collection chamber opposite the axial location of the one or more turbine blades; and the inlet of the gas compressor supplied with liquid from the radially inboard liquid annular space.

5. An energy recovery system for a gas compressor as claimed in claim 4, including a weir in the radially inboard liquid annular space to control the radial depth of the liquid therein, the weir forming an annular pool of liquid to be fed to the inlet of the gas compressor.

6. An energy recovery system for a gas compressor as claimed in claim 5, wherein:

the gas compressor includes a plurality of compression tubes, each of the plurality of compression tubes having a siphon passageway extending between the annular pool to a corresponding compression tube output and a respective input port for each corresponding compression tube and a gas inlet supplying gas to each respective siphon passageway;

whereby the gas is mixed with the liquid fed into the inlet of the gas compressor emulsion is generated by the siphon passageway, the gas inlet and the annular pool.

7. An energy recovery system for a gas compressor as claimed in claim 6, wherein each of the plurality of compressor tubes includes one or more castellated tube ends formed at a radially proximally terminal end.

8. An energy recovery system for a gas compressor as claimed in claim 1, including a heat transfer subsystem including one or more of internally extending heat transfer fins and one or more externally extending heat transfer fins, the internal heat transfer fins extending into the annular lake, the external heat transfer fins extending outboard of the hollow cylindrical housing.

9. An energy recovery system for a gas compressor as claimed in claim 1, wherein the output axle extends coaxially outboard from the hollow cylindrical housing; and wherein the gas compressor provides energy recovery by utilization of torque applied to the output axle.

10. A gas compressor as claimed in claim 1, including a brake operatively coupled to either the turbine or to the output axle.

* * * * *